US007679939B2

(12) United States Patent
Gong

(10) Patent No.: US 7,679,939 B2
(45) Date of Patent: Mar. 16, 2010

(54) CONTROL CIRCUIT FOR A SWITCHING POWER SUPPLY, METHOD FOR CONTROLLING A SWITCHING POWER SUPPLY AND COMPUTER PROGRAM

(75) Inventor: Xiao Wu Gong, Singapore (SG)

(73) Assignee: Infineon Technologies AG, Munich (DE)

( * ) Notice: Subject to any disclaimer, the term of this patent is extended or adjusted under 35 U.S.C. 154(b) by 421 days.

(21) Appl. No.: 11/668,593

(22) Filed: Jan. 30, 2007

(65) Prior Publication Data

US 2007/0195559 A1 Aug. 23, 2007

(30) Foreign Application Priority Data

Jan. 30, 2006 (EP) .................................. 06001879

(51) Int. Cl.
*G05F 1/46* (2006.01)
*G05F 1/575* (2006.01)
*G05F 1/571* (2006.01)
*G05F 1/567* (2006.01)

(52) U.S. Cl. .............. 363/21.18; 363/21.15; 363/21.17; 363/97

(58) Field of Classification Search .............. 363/21.01, 363/21.13, 21.15, 21.16, 21.18, 95, 97, 21.17; 323/282

See application file for complete search history.

(56) References Cited

U.S. PATENT DOCUMENTS 5,812,383 A * 9/1998 Majid et al. ............... 363/21.05
6,674,656 B1 1/2004 Yang et al. .................. 363/21.1

FOREIGN PATENT DOCUMENTS

JP 2003 244953 A 8/1929
WO 2004/030194 A1 4/2004

* cited by examiner

*Primary Examiner*—Gary L Laxton
*Assistant Examiner*—Nusrat J Quddus
(74) *Attorney, Agent, or Firm*—Eschweiler & Associates, LLC

(57) ABSTRACT

A control circuit for a power supply having a controllable switch for switching a current through a first transformer winding and a voltage providing circuit for providing an output voltage based on a voltage generated in a second transformer winding has a comparing unit for generating a comparison signal. The control circuit has a threshold signal modulation circuit adapted to modulate the threshold signal that the comparison signal is activated as soon as the input signal crosses a first threshold value, if the current flowing through the switch exhibits a first current slope rate, and that the comparison signal is activated as soon as the input signal crosses a second threshold value, if the current flowing through the switch exhibits a second current slope rate smaller than the first rate. For a given voltage, the first threshold is smaller than the second threshold.

18 Claims, 10 Drawing Sheets

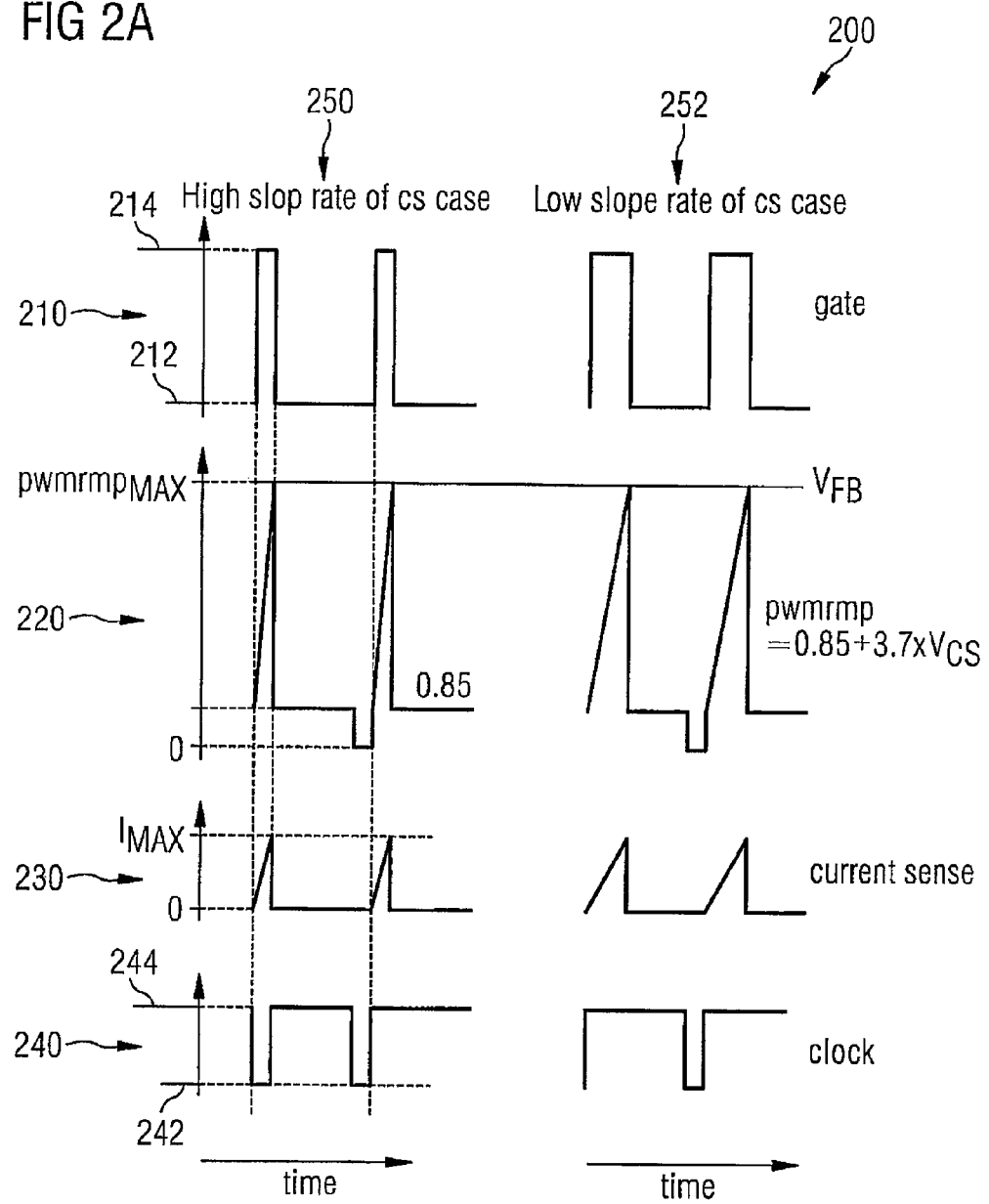

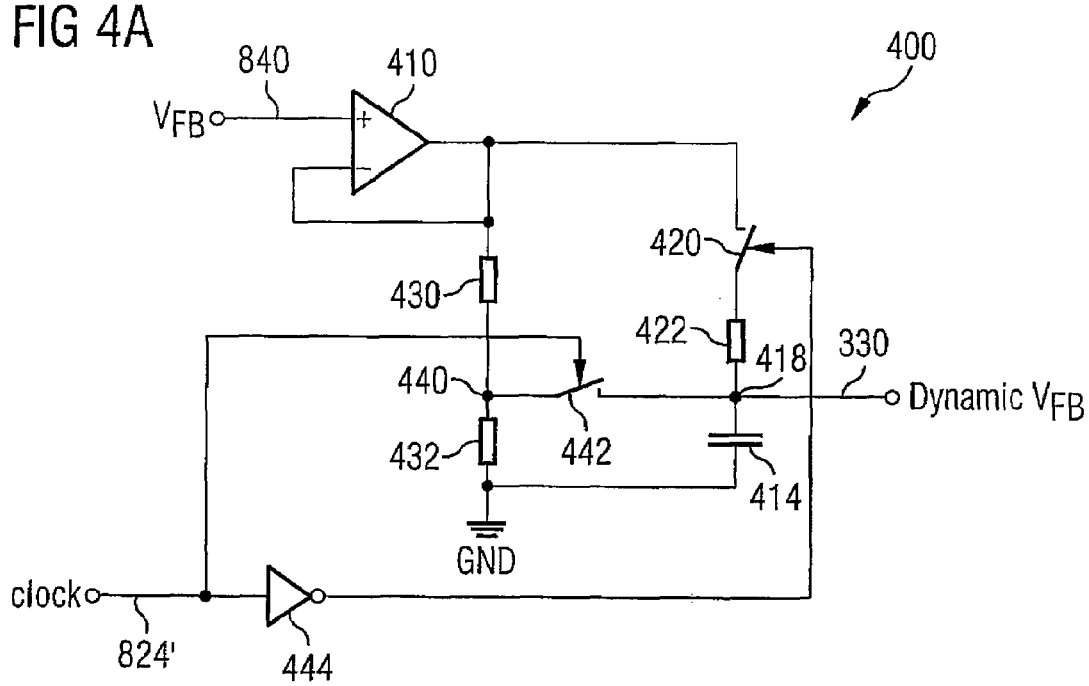
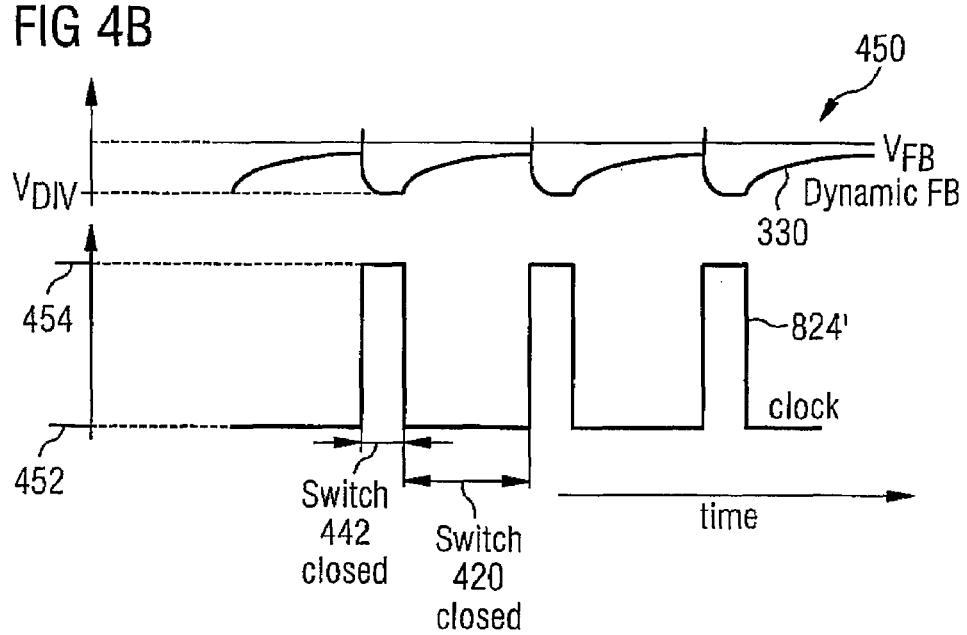

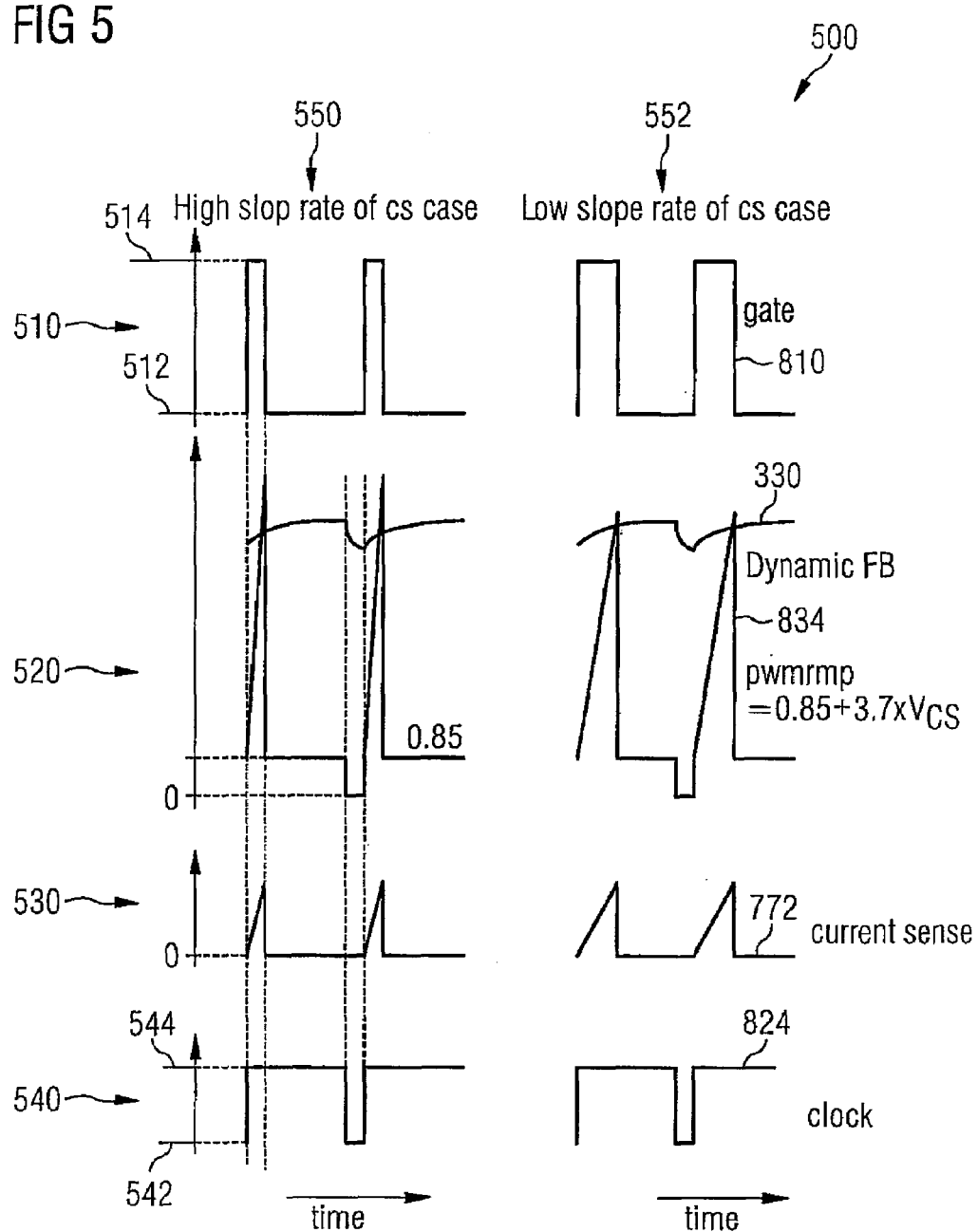

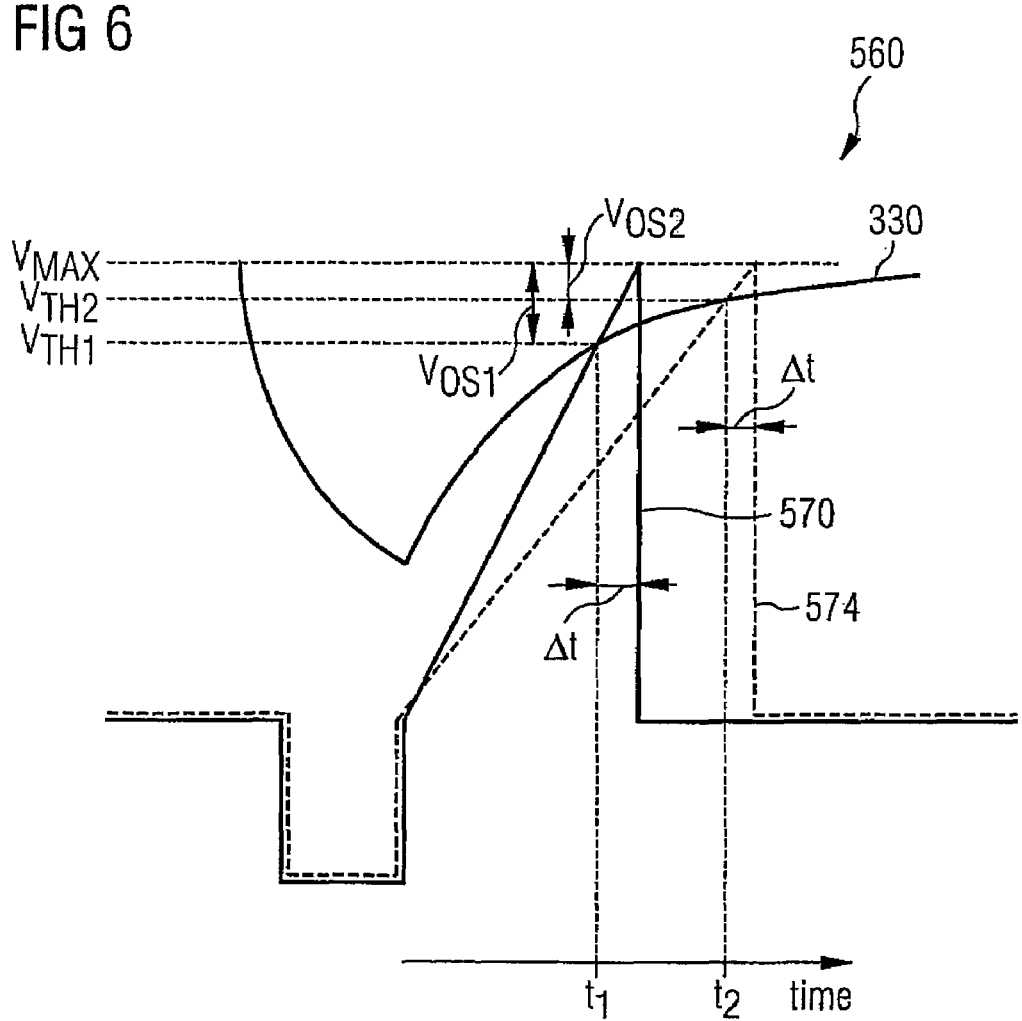

US 7,679,939 B2

CONTROL CIRCUIT FOR A SWITCHING POWER SUPPLY, METHOD FOR CONTROLLING A SWITCHING POWER SUPPLY AND COMPUTER PROGRAM

RELATED APPLICATION

This application claims priority from European Patent Application No. 06001879.3, which was filed on Jan. 30, 2006, and is incorporated herein by reference in its entirety.

TECHNICAL FIELD

The present invention is generally related to a control circuit for a switching power supply, a method for controlling a switching power supply and a computer program. In particular, the present invention is related to a circuit using a dynamic feedback voltage to improve the performance for entering a burst mode in a switching power supply.

BACKGROUND

In present applications a large number of requirements is set up for switching power supplies. For example, a power supply needs to be capable of providing a large output power. Furthermore, it is required that a switching power supply comprises a low standby power consumption in case a load current provided to a circuit supplied by the power supply is comparatively small.

It was found that a low standby power can be achieved by using an active burst mode, which will be described in more detail in the following.

FIG. 7 shows an example of a switching power supply offering an active burst mode. The circuit of FIG. 7 is designated in its entirety with 700. The circuit 700 receives an alternating voltage at an input 710 and provides a converter DC output voltage at an output 712. A rectifying circuit 714 generates a DC voltage 716 which is buffered by a buffer capacitor 718. Further, a first winding 720 is connected in series with a drain-source-path of a MOS-field effect transistor 722 and a current sense resistor 724 between the DC voltage 716 and a reference potential GND, wherein the voltage over the current sense resistor 724 is a pulse voltage which is present at 772. Besides, a snubber 726 is connected in parallel with the first winding 720. A gate terminal of the MOS-field effect transistor 722 is controlled by an integrated circuit 730, which will be described in more detail in the following.

The first winding 720 is part of a transformer 740 that further comprises a second winding 742 and a third, auxiliary winding 744. The second winding 742 is connected, via a rectifying diode 746, to a filter network 748. The filter network 748 comprises two capacitors and an inductor in a H circuit configuration. An output voltage $V_{OUT}$ is available at the output port of the filter network 748.

The circuit 700 further comprises a feedback circuit 750. The feedback circuit 750 comprises an optocoupler 752. A current flowing through a light emitting diode of the optocoupler 752 is dependent on a voltage at an input port of the filter network 748. The current through the light emitting diode of the optocoupler 752 is further dependent on a voltage present at the output 712 of the circuit 700. Thus, the current through the light emitting diode of the optocoupler 752 increases with an increasing voltage at the input of the filter network 748. An npn-photo-transistor of the optocoupler 752 is connected between the ground potential GND and a feedback input FB of the integrated circuit 730.

It should be noted here that a collector terminal of the photo transistor of the optocoupler 752 is pulled to a voltage which is positive with respect to the reference potential GND over a resistor $R_{FB}$ within the integrated circuit 730. Thus, a feedback voltage at the feedback input terminal FB of the integrated circuit 730 decreases with an increasing photo current. In other words, if the voltage at the input port of the filter network 748 increases, the voltage at the feedback terminal FB of the integrated circuit 730 decreases and vice versa.

In the following section, details of the integrated circuit 730 will be described. However, for a full description of the operation of the circuit 700 reference should be taken for example to the datasheet titled "F3; ICE3AS02/ICE3BS02, ICE3AS02G/ICE3BS02G, Off-Line SMPS Current Mode Controller with Integrated 500V Startup Cell, Version 1.2", dated Sep. 2, 2005, which is available from Infineon Technologies AG.

The integrated circuit 700 comprises a total of seven terminals. A soft start terminal 760 is connected over a capacitor 762 with the reference potential GND. The soft start pin combines the function of a soft start during a startup of the integrated circuit 730 and an error detection for an auto restart mode. These functions are implemented and can be adjusted by means of the external capacitor 762 connected between the soft start pin 760 (also designated with SoftS). The capacitor also provides an adjustable blanking window for high load jumps before the integrated capacitor 730 enters into the auto restart mode, which will be described below.

A feedback pin 764 (also designated with FB) receives an information about the regulation. The information received over the feedback pin 764 is provided to an internal protection unit and to an external pulse width modulation comparator to control the duty cycle of the MOS-field effect transistor 722. The signal at the feedback pin 764 further controls the active burst mode of the integrated circuit 730 in case of a light load at the output 712.

A high voltage pin 765 (also designated with HV) is connected to the rectified DC input voltage 716. The rectified DC voltage 716 is the input for a startup cell integrated in the integrated circuit 730.

A power supply pin 766 (also designated with VCC) is the positive supply of the integrated circuit 730. The voltage at the power supply pin 766 is derived from the third winding 744 of the transformer 740 over a one-way rectification circuit.

The integrated circuit 730 provides a drive signal to an external MOS-field effect transistor 722 over a gate pin 768.

Besides, the integrated circuit 730 senses the voltage developed over the current sensing resistor 724 (the series resistor inserted in series with the drain-source-path of the MOS-field effect transistor 722 and the first winding 720 of transformer 740). A voltage proportional to the current through the current sensing resistor 724 (and the first winding 720, unless some current is flowing through the snubber circuit 726) is fed into a current limiting circuit 770 via a current sense pin 772 (also designated with CS). If the voltage at the current sense pin 772 reaches an internal threshold of a current limit comparator CIO included in the current limiting circuit 770, the MOS-field effect transistor 722 is immediately switched off. Furthermore, the current information input into the integrated circuit over the current sense pin 772 is provided (in a scaled form) to a pulse width mode comparator C8 to realize a regulation.

The integrated circuit 730 consists of a number of blocks, which will be described in more detail in the following. A control unit 800 controls different states of the integrated circuit 730. Transitions between the operating modes, for example a soft start mode, an active burst mode, a current mode, and additional protection modes, are initiated depending on a voltage at the soft start pin 760 and a voltage at the feedback pin 764.

For the understanding of the present invention, the current mode, which constitutes a normal operation mode of the switching power supply 700, and the active burst mode, which constitutes an energy saving operation mode of the switching power supply 700, are particularly relevant. Therefore, these modes will be described in detail in the following.

The integrated circuit 730 provides the active burst mode for low load conditions at the output 712. During the active burst mode, which is controlled only by the voltage at the feedback pin 764, the integrated circuit 730 is active and can therefore immediately respond to fast changes at the feedback pin 764. At the same time, a comparatively low (lower than in the normal mode) power consumption of the switching power supply is ensured.

If the voltage at the feedback pin 764, which is low pass filtered by a low pass filter network 802, falls below a level of 1.32 volt, a comparator C5 provides a signal to the AND-gate G6. If the respective condition (voltage at feedback pin 764 smaller than 1.32 volt) is maintained for a certain period of time, a delay circuit (consisting of the OR-gate G2, switch S1, a 4.4 volt zener-diode, a 5 kΩ resistor, capacitor 762 and comparator C3) indicates that the active burst mode should be entered. The respective signal to enter the active burst mode is output by AND-gate G6. In other words, a time window is generated by combining the signal at the feedback pin 764 and the voltage at the soft start pin 760 with the AND-gate G6, which prevents a sudden entering of the active burst mode due to a large load jump. The time window is adjusted by the external capacitor 762. After entering active burst mode, a burst flag is set. An active burst mode control circuit 804 acts to limit the current flowing through the first winding 720 when the integrated circuit 730 is in the active burst mode. For this purpose, a current limit is set using the comparator C12 and the AND-gate G10, as will be described in more detail below.

Due to the current limit imposed in the active burst mode, conduction losses are reduced and a generation of audible noise by the switching power supply 700 is avoided. The operation of the active burst mode is further controlled by the voltage at the feedback pin 764, wherein the outputs of comparators C6a and C6b are used to decide whether to activate or deactivate the generation of current pulses in the first winding 720.

Upon entering the active burst mode, an internal bias of the integrated circuit 730 is switched off in order to reduce the current consumption of the integrated circuit 730. Under this condition, the MOS-field effect transistor 722 is not activated. After entering the active burst mode, the voltage at the feedback pin 764 rises, as a voltage at the output 712 of the filter network 748 begins to fall in the absence of current pulses in the first winding 720. Comparator C6a observes the voltage at the feedback pin 764.

If the voltage at the feedback pin 764 exceeds for example a level of 4V, the internal bias of the integrated circuit 730 is again activated. Thus, the integrated circuit 730 drives the MOS-field effect transistor 722 to generate current pulses, wherein the current flowing through the first winding 720 of the transformer 740 is limited to a comparatively small value, as determined by comparator C12. Due to the reactivation of the generation of current pulses in the first winding 720, the voltage in the filter network 740 increases again. Consequently, the voltage at the feedback pin 740 decreases.

If the voltage at the feedback pin 764 reaches for example a level of 3.4 volt, comparator C6b provides a signal to deactivate again an internal bias of the integrated circuit 730. As a consequence, a generation of current pulses in the first winding 720 is interrupted, until the voltage at the feedback pin 734 again reaches the above described threshold of e.g. 4.0V.

Consequently, the above-described sequence is repeated, deactivating the internal bias of the integrated circuit 730. The integrated circuit 730 remains in the active burst mode, until the load at the output 712 of the switching power circuit 700 is changed (increased). If a sufficiently high load connected to the output 712 of the switching power supply 700 is activated, the voltage at the feedback pin 764 increases. Such an increase is detected by the comparator C4. Thus, if C4 detects that the voltage at the feedback pin 764 exceeds a threshold value of for example 4.8 volt, the active burst mode is left. The output of comparator C12 is blocked upon a leaving the active burst mode, so that the current limitation imposed by the comparator C12 is no longer effective. So, after leaving the active burst mode, a maximum current can be provided (within the limits of the current limitation introduced by the comparator C10) to stabilize the voltage $V_{OUT}$ present at the output 712 of the switching power supply 700.

To summarize the above, the voltage at the feedback pin 764 is used to control the operation of an energy saving mode designated as active burst mode. When the voltage of the feedback pin 764 falls below a certain first threshold (e.g. 1.32 V) indicating a small load condition at the output 712 of the switching power supply, the active burst mode is entered, which results in a deactivation of the current pulses in the first winding 720 of the transformer 740. Only when the voltage at the feedback pin 764 exceeds a second threshold level (e.g. 4.0 volt), current pulses in the first winding are re-activated. As long as the integrated circuit 730 is in the active burst mode, a current limitation is imposed on the current pulses in the first winding 720, which is lower than a maximum current which is allowable when the active burst mode is inactive. If the integrated circuit 730 is in the active burst mode and current pulses are enabled, current pulses are generated in the first winding 720 until the voltage at the feedback pin 734 reaches another third threshold value (e.g. 3.4 volt). As soon as the feedback voltage reaches the third threshold value, the generation of current pulses in the first winding 720 is deactivated. Consequently, the voltage at the feedback pin 764 reaches the second threshold value (e.g. 4.0 volt) again, and the cycle is repeated. Thus, a hysteresis is achieved, as the generation of current pulses in the first winding is activated when the voltage at the feedback pin 764 reaches the second threshold value, and is deactivated when the voltage at the feedback pin reaches the third threshold value. Besides, the active burst mode is left when the voltage at the feedback pin 764 reaches a fourth threshold level (e.g. 4.8 volt).

It should be noted here, that the threshold levels described above will be referred to in the following as active burst mode threshold values.

In the following, the generation of a drive signal 810 for the MOS field effect transistor 722 will be described in detail. The drive signal 810 is generated in a pulse width modulation section 820. The pulse width modulation section 820 comprises an oscillator 822. The oscillator 822 generates two clock signals 824, 826 having the same frequency but different duty cycles. However, for the switching power supply 700 the rising edges of the first clock signal 824 and the second clock signal 826 coincide. The second clock signal 826 produces a short pulse to set a flip flop FF1. Provided the first clock signal 824 is active and a gate G8 does not provide an inhibiting signal, the setting of the flip flop FF1 results in a switching-on of the MOS-field effect transistor 722. On the other hand, as soon as the first clock signal 824 gets inactive or any of the inputs of gate G8 is activated, the MOS-field effect transistor 722 is switched off to interrupt the current through the first winding 720 of the transformer 740.

In other words, the MOS-field effect transistor 722 is activated upon a rising edge of the clock signals 824, 826 and is deactivate if either the first clock signal 824 gets inactive or any of the inputs of the gate G8 are activated. In the switching power supply 700 of FIG. 7 there are, apart from the deactivation of the first clock signal 824, four mechanisms that result in a deactivation of the MOS-field effect transistor 722.

All these mechanisms are based on a determination of the current flowing through the first winding 720 or the drain-source-path of the MOS-field effect transistor 720, respectively. The described current is sensed by the current sensing resistor 724, and a voltage proportional to the current flowing through the drain-source-path of the MOS-field effect transistor 722 is therefore provided at the current sense pin 772 of the integrated circuit 730. An input filtering is applied to the voltage at the current sense 772 of the integrated circuit 730 by a filter and input protection circuit 828. Further, a leading edge of the voltage at the current sense pin 772 is suppressed in a leading edge blanking circuit 830. A current describing signal 832, which is derived from the voltage at the current sense pin 772 and describes the current through the drain-source-path of the MOS-field effect transistor 722 (with the exception of leading edges, which are suppressed in the leading edge blanking circuit 830) is fed as an input signal into comparators C10 and C12. Comparator C10 compares the signal 832 with a threshold signal describing a maximum allowable current. If the current describing signal 832 exceeds the threshold signal applied to comparator C10, the comparator C10 sends an active signal to gate G8, which results in a deactivation of the MOS-field effect transistor 722. In other words, as soon as the current through the drain-source-path of the MOS-field effect transistor 722 exceeds a predetermined level, the MOS-field effect transistor 722 is switched off, so that a further increase of the current is avoided. So, comparator C10 provides a current limitation in the normal operation mode (non-energy saving operation mode).

Besides, when the integrated circuit 730 is in the active burst mode, the output of comparator C12, which compares the signal 830 to a predetermined current threshold signal (smaller than the current threshold signal provided to comparator C10), is coupled to the input of gate G8 over the AND-gate G10. In other words, in the active burst mode the MOS-field effect transistor 722 is deactivated as soon as the current describing signal 832 exceeds the value of the current reference signal applied to comparator C12.

The current describing signal 832 is further scaled to provide a scaled current describing signal 834 derived from the current flowing through the drain-source-path of the MOS-field effect transistor 722. The scaled signal 834 is compared with a low pass filtered feedback signal 840 derived from the signal present at the feedback pin 764 of the integrated circuit 730 in a pulse width modulation comparator C8. If the scaled signal crosses a threshold level defined by the (low pass filtered) feedback signal 840, the output of the pulse width modulation comparator C8, which is coupled to an input of the gate G8, is activated. Thus, in response to an activation of the output of the pulse width modulation comparator C8, the MOS-field effect transistor 722 is switched off.

Furthermore, during the startup of the integrated circuit 730, a signal provided by a soft start circuit 850 is effective to the switch of the MOS-field effect transistor 722.

In the following, in order to facilitate the understanding of the circuit 700, the (normal, current mode) operation of the circuit 700 will be described, based on the assumption that the integrated circuit 730 is neither in a soft start condition nor in an active burst mode condition, and that further the current limiting comparator C10 is inactive.

In this case, a duty cycle of the drive signal 810 for the MOS-field effect transistor 722 is determined by a regulation loop, wherein the voltage at the feedback pin 764 is derived from the voltage present in an output circuit of the switching power supply (the output circuit consisting of the second winding 742, the rectifying diode 746 and the filter network 748). The feedback signal 840 serves a reference signal for the pulse width modulation comparator C8. As soon as the scaled signal 834 descriptive of the current flowing through the MOS-field effect transistor 722 crosses a level defined by the feedback signal 840, the output of the comparator C8 is activated. In the response to the activation of the output of the pulse width modulation comparator C8, the MOS-field effect transistor 722 is deactivated after a delay time. If the voltage in the output circuit 742, 746, 748 of the switching power supply 700 is comparatively high, the feedback signal 840 has a comparatively low value. Thus, the output of the pulse width modulation comparator C8 is activated at a comparatively small value of the current flowing through the MOS-field effect transistor 722. Consequently, the duty cycle of the current flowing through the first winding 720 of the transformer 740 is comparatively low, which results in a reduction of the voltage in the output circuit of the switching power supply 700. In contrast, if the voltage in the output circuit 742, 746, 748 of the switching power supply 700 is comparatively low, the feedback signal 840 is comparatively high, which results in a comparatively high duty cycle of the current flowing through the first winding 720 of the transformer 740. This results in an increase of the voltage present in the output circuit of the switching power supply 700.

However, it was found that for example for a small load present at the output 712 of the switching power supply 700, the voltage of the feedback signal 840 (in an equilibrium state) varies significantly with changes of the DC voltage 716, which brings along significant problems when controlling activation and/or deactivation of power saving modes (like the active burst mode) on the basis of the feedback signal 840.

SUMMARY

A control circuit for a switching power supply, a method for controlling a switching power supply and a respective computer program can be provided which can be applied to reduce a sensitivity of the switching power supply to changes of the voltage available for generating a current flow in the transformer.

According to an embodiment, a control circuit for a switching power supply may have a controllable switch for switching a current flowing through a first winding of the transformer and a voltage providing circuit for providing an output voltage based on a voltage generated in a second winding of the transformer. The control circuit may comprise a comparing circuit for obtaining a comparison signal based on a comparison between an input signal derived from a current through the switch or through the first winding and a threshold signal dependent on a voltage present in the voltage providing circuit. According to an embodiment, the control circuit further may comprise a threshold signal modulation circuit adapted to modulate the threshold signal in such a way that the comparison signal is activated as soon as the input signal derived from the current flowing through the switch crosses a first threshold value, if the current flowing through the switch or through the first winding exhibits a first current slope rate, and that the comparison signal is activated as soon as the input signal derived from the current flowing through the switch crosses a second threshold value, if the current flowing through the switch or through the first winding exhibits a second current slope rate smaller than the first slope rate. For a given voltage present in the voltage providing circuit, the first threshold value can be smaller than the second threshold value. The control circuit further comprises a switch driver for closing the switch periodically, and for opening the switch in response to an activation of the comparison signal provided by the comparing circuit.

BRIEF DESCRIPTION OF THE DRAWINGS

Preferred embodiments will subsequently be described with reference to enclosed Figs., in which:

FIG. 2a shows idealized waveforms for different slope rates of a current flowing through the switch within a regulation circuit of a switching power supply;

FIG. 4a a circuit schematic of a feedback voltage modulator block for usage in the control circuit;

FIG. 4b a graphical representation of waveforms for a feedback voltage, a clock signal and a dynamic feedback voltage in a circuit as shown in FIG. 4a;

FIG. 5 shows a first graphical representation of waveforms for different slope rates of the current flowing through the switch present in a switching power supply having a control circuit;

FIG. 6 shows a second graphical representation of waveforms for different slope rates of the current flowing through the switch present in a switching power supply having a control circuit.

DETAILED DESCRIPTION

Figure 1:
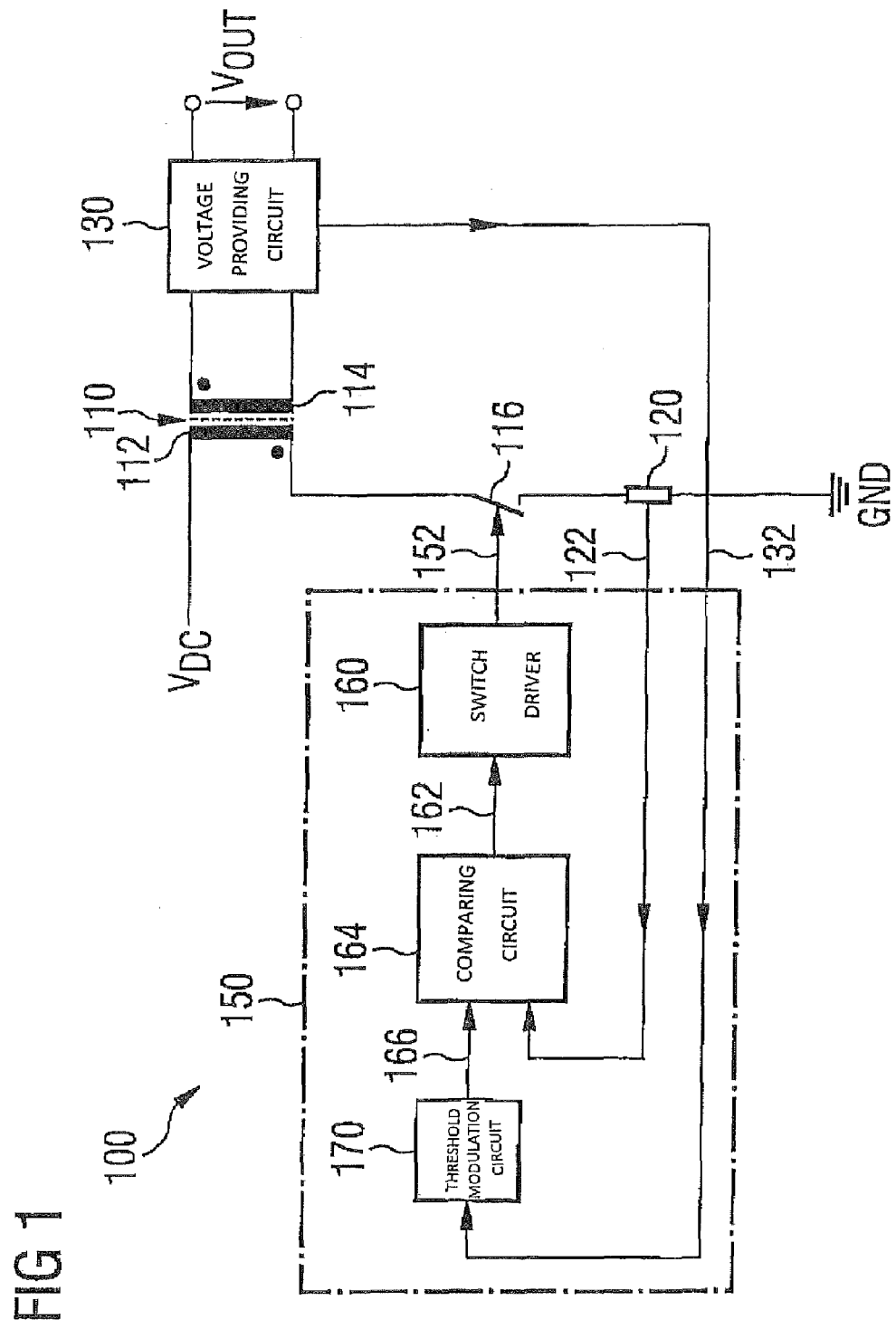
FIG. 1 shows a block schematic diagram of a control circuit for a switching power supply according to a first embodiment.

According to different embodiments, a dependence on a current slope rate of the current flowing through the controllable switch is introduced into the feedback loop of a switching power supply and consequently through the primary (first) winding of the transformer of the switching power supply. It was recognized that such a dependence on the slope rate of the current flowing through the switch can be introduced in an advantageous way by modulating a threshold signal descriptive of a voltage in the voltage providing circuit of the switching power supply in such a way, that a threshold value defining at which level of the input signal derived from the current flowing through the switch the comparison signal is activated is dependent on the slope rate of the current switch.

Furthermore, it has been found that the threshold signal has to be modulated in such a way, that the threshold value is smaller when the current flowing through the switch exhibits a comparatively large slope rate, and that the threshold level is larger when the current flowing through the switch exhibits a comparatively small slope rate.

The described modulation of the threshold signal applied to the comparing circuit allows for a compensation of an overshoot, which occurs due to a delay between the activation of the comparison signal and the actual opening of the switch. In other words, the current through the switch (or through the first winding) increases at the current slope rate between the point of time when the comparing circuit activates the comparison signal, indicating that the input signal derived from the current flowing through the switch crosses the level defined by the threshold signal, and the point in time when the switch is actually opened. It was found, that at the actual point in time of opening the switch similar maximum currents can be reached for current different slope rates, if the threshold signal is modulated in the way according to different embodiments.

Thus, according to different embodiments, a steady state condition of the switching power supply is yield which is substantially independent on the slope rate of the current flowing through the switch (or through the first winding) by providing to a pulse width modulator comparing circuit a threshold signal, which by means of an appropriate modulation combines the functionality of a feedback signal for the pulse width modulation and a slope rate compensation signal.

Thus, by using a modulated threshold signal, both feedback and slope rate compensation can be performed by the comparing circuit.

According to different embodiments, a number of additional advantages are achieved which will be described in the following. A switching power supply comprising a control circuit exhibits a simple circuit topology. A slope rate of the current through the switch (or through the first winding) is used to modulate a threshold voltage of the comparing circuit, which is used to determine by means of the comparison signal at which point in time the switch is opened. In dependence on the current slope rate, the timing of the control circuit is automatically adjusted merely by the modulation of the threshold signal present at the input of the comparing circuit. Thus, there is no need for adjusting any additional timing parameters (like delay times) of the circuit stages in dependence of the slope rate of the current through the switch. So, the pulse-width-modulation comparator (comparing circuit) can be reused for the current slope rate compensation.

Besides, it can be reached that the voltage present in the voltage providing circuit (the output circuit of the switching power supply connected with the second, secondary winding of the transformer) is independent or only weakly dependent on the slope rate of the current flowing through the switch or the first winding. In other words, the voltage present in the voltage providing circuit comprises a weaker dependence on the voltage available to generate the current flow through the first winding of the transformer when compared to known switching power supplies. Thus, a change of the AC or Dc supply voltage, from which the switching power supply is powered, has a weaker impact on the voltage present in the voltage providing circuit and on the output voltage of power supply when compared to conventional switching power supplies.

For the above-described reason, the feedback voltage available to the control circuit, which is directly derived from the voltage present in the voltage providing circuit (e.g. the output voltage of the power supply) does not exhibit a strong dependence on the supply voltage available for the switching power supply. Thus, the feedback voltage, from which the modulated threshold signal is derived, and which is a measure for the voltage in the voltage providing circuit, is also a good measure for the load condition of the switching power supply. Consequently, according to an embodiment, the feedback voltage available to the control circuit, which is typically a non-linear function of the output voltage of the switching power supply, can be used to make a reliable decision about entering an energy conserving mode of the switching power supply according to an embodiment.

In an embodiment, the threshold signal modulation circuit is adapted to receive a signal derived from the voltage present in the voltage providing circuit and to generate a time varying modulated threshold signal on the basis of the received signal descriptive of the voltage present in the voltage providing circuit, such that the modulated threshold signal exhibits a time variation even if the received signal is constant. The received signal has an influence on a voltage level of the modulated threshold signal. The threshold signal modulation circuit is further adapted such that a temporal modulation of the threshold signal is time-synchronized at least with an opening of the switch or a closing of the switch.

Thus, in the described embodiment the threshold signal modulation circuit generates a time varying threshold signal synchronized with the opening or closing of the switch, wherein the level of the threshold signal is dependent on the voltage present in the voltage providing circuit. The time variation of the threshold signal results in a time varying threshold level of the comparing circuit, wherein the time variation of the threshold value is time-synchronized with an opening or closing of the switch. Neglecting parasitic effects, the current flowing through the switch increases monotonically, at the current slope rate, with time after closing the switch, and the threshold level of the comparing circuit also increases with time after closing the switch. The level at which the comparing circuit activates the comparison signal is dependent on the slope rate of the current flowing through the switch. Consequently, it is not necessary to explicitly determine the slope rate of the current flowing through the switch in order to achieve the effect that the level of the input signal describing the current flowing through the switch, at which the comparison signal is activated, is dependent on the slope rate of the current flowing through the switch. In contrast, the modulated, time varying threshold signal which is time-synchronized with the opening and/or the closing of the switch automatically results in a dependence of the switching level of the comparing circuit on the slope rate of the signal describing the current flowing through the switch.

In another preferred embodiment, the control circuit comprises a clock circuit adapted to generate a clock signal. The switch driver is adapted to close the switch in response to a transition of the clock signal from a first state to a second state. For this embodiment, the threshold signal modulation circuit is adapted to pull the threshold signal to a first value while the clock is in the first state, and to monotonically vary the threshold signal while the clock signal is the second state, such that the threshold signal defines a threshold level increasing with time while the clock signal is in second state. Such an arrangement results in a monotonic increase of the threshold level defined by the threshold signal when the switch is closed. If the current flowing through the switch exhibits a large slope rate, the input signal of the comparing circuit describing the current flowing through the switch crosses the level of the threshold signal when a first period time has elapsed after the closing of the switch. At this point in time, the threshold signal defines a first threshold level. If the current flowing through the switch exhibits a small slope rate, the input signal of the comparing circuit describing the current flowing through the switch crosses the level of the threshold signal when a second period of time has elapsed after the closing of the switch. At this point in time, the threshold signal defines a second threshold level. The second threshold level is higher than the first threshold level, as required according to an embodiment. Thus, the described circuit concept is particularly advantageous in order to realize the idea with minimal effort.

In another preferred embodiment, the threshold signal modulation circuit comprises a capacitor and is adapted to provide the voltage at the capacitor as the modulated threshold signal or to derive the modulated threshold signal from the voltage at the capacitor. The threshold signal modulation circuit is further adapted to charge the capacitor to a first voltage over a first resistor in the first state of the clock signal and to charge the capacitor to a second voltage over a second resistor in the second state of the clock signal. The first voltage is preferably smaller than the second voltage, and the first resistor is preferably smaller than the second resistor. By using a capacitor which is charged over an impedance, respective steady state values of the threshold signal, which are reached after a long period of time has elapsed, and respective time constants required to approximate the steady state value can be defined. Furthermore, by charging and discharging a capacitor, an exponential type time variation of the threshold signal can be reached.

It has been found, that the exponential type time variation brings along a good compromise with respect to a final maximum value of the current flowing through the switch reached at the time when the switch is actually switched off, and the complexity for the implementation of the circuit for generating the threshold signal. The resistors may be chosen appropriately in order to adapt the time constant of the threshold signal modulation circuit to the delay time of the switch driver and the switch. Besides, the first voltage and the second voltage, to which the capacitor is charged in dependence on the state of the clock signal, may be chosen to be dependent on the voltage present in the voltage providing circuit, so that the comparing circuit in combination with the threshold signal modulation circuit can fulfill the task of providing a threshold voltage for a pulse width modulation of the current flowing through the first winding of the transformer dependent on the voltage present in the voltage providing circuit.

A method for controlling a switching power supply may implement the concept described with respect to the control circuit. Besides, a computer program product can be adapted to execute the method.

FIG. 1 shows a block schematic diagram of a switching power supply having an control circuit according to an embodiment. The switching power supply of FIG. 1 is designated in its entirety with 100. The power supply 100 comprises a transformer 110 having at least a first, primary winding 112 and a second, secondary winding 114. The power supply 100 further comprises a controllable switch 116 which is connected in series with the first winding 112 between a (typically positive) supply potential $V_{DC}$ and a reference potential GND. The switching power supply 116 further comprises a current sensing circuit 120 which is adapted to derive from a current flowing through the first winding 112 or through the switch 116 a current sense signal 122 describing the current flowing through either the first winding 112 or through the controllable switch 116. The switching power supply 100 further comprises a voltage providing circuit 130 connected to the second, secondary winding 114 of transformer 110 and adapted to provide an output voltage $V_{OUT}$ based on a voltage generated in the second winding 114 of the transformer 110. The voltage providing circuit 130 is further adapted to provide a feedback signal 132 which is dependent on a voltage present in the voltage providing circuit 130.

A control circuit 150 of the switching power supply 100 receives the current sense signal 122 and the feedback signal 132 and provides a drive signal 152 for the controllable switch 116. The control circuit 150 comprises a switch driver 160. The switch driver 160 provides the drive signal 152 for the controllable switch 116, and is adapted to close the switch periodically, and to open the switch in response to an activation of a comparison signal 162 provided by a comparing circuit 164. The comparing circuit 164 generates the comparison signal 162 based on a comparison between the current sense signal 122 derived from a current flowing through the first winding 112 or through the controllable switch 116 and a threshold signal 166. The threshold signal 166 is generated by a threshold signal modulation circuit 170 using the feedback signal 132.

The threshold modulation circuit 170 modulates the threshold signal 166 in such a way that the comparison signal 162 is activated as soon as the current sense signal 122 crosses a first threshold value, if the current flowing through the first winding or through the switch exhibits a first current flow rate, and that the comparison signal 162 is activated as soon as the current sense signal 122 crosses a second threshold value, if the current flowing through the first winding 112 or through the controllable switch 116 exhibits a second current slope rate smaller than the first current slope rate, wherein, for a given voltage present in the voltage providing circuit 130, the first threshold value is smaller than the second threshold value.

Thus, the threshold signal modulation circuit 170 receives the feedback signal 132 and generates, on the basis of the feedback signal, the modulated threshold signal 166 such that the threshold for the activation of the comparison signal 162 is dependent on the slope rate of the current flowing through the switch 116 or through the first winding 112 of the transformer 110. The dependency of the threshold value for the activation of the comparison signal 162 is such that the comparison signal 162 is activated when the current flowing through the switch 116 or through the first winding 112 reaches a first, comparatively smaller value if the current exhibits a comparatively large slope rate, and that the comparison signal 162 is activated when the current flowing through the switch 116 or through the first winding 112 reaches a second, comparatively larger value if the current flowing through the switch 116 or through the first winding 112 exhibits a comparatively smaller slope rate.

The described functionality of the control circuit 150 brings along the significant advantage that the voltages present in the voltage providing circuit 130 and the feedback signal 132 exhibit a reduced dependence on the actual value of the supply voltage $V_{DC}$ when compared to known switching power supplies. Using the concept according to an embodiment, the feedback signal 132 is mainly dependent on a load condition of the switching power supply 100 and is therefore a good indicator of when the switching power supply 100 should enter an energy conserving mode. Thus, in contrast to conventional switching power supplies, the entering of a power conserving operation mode can be reliably controlled by the feedback signal 132.

In order to provide an improved understanding according to different embodiments, an analysis of a known circuit approach will be given in the following.

Figure 7A:
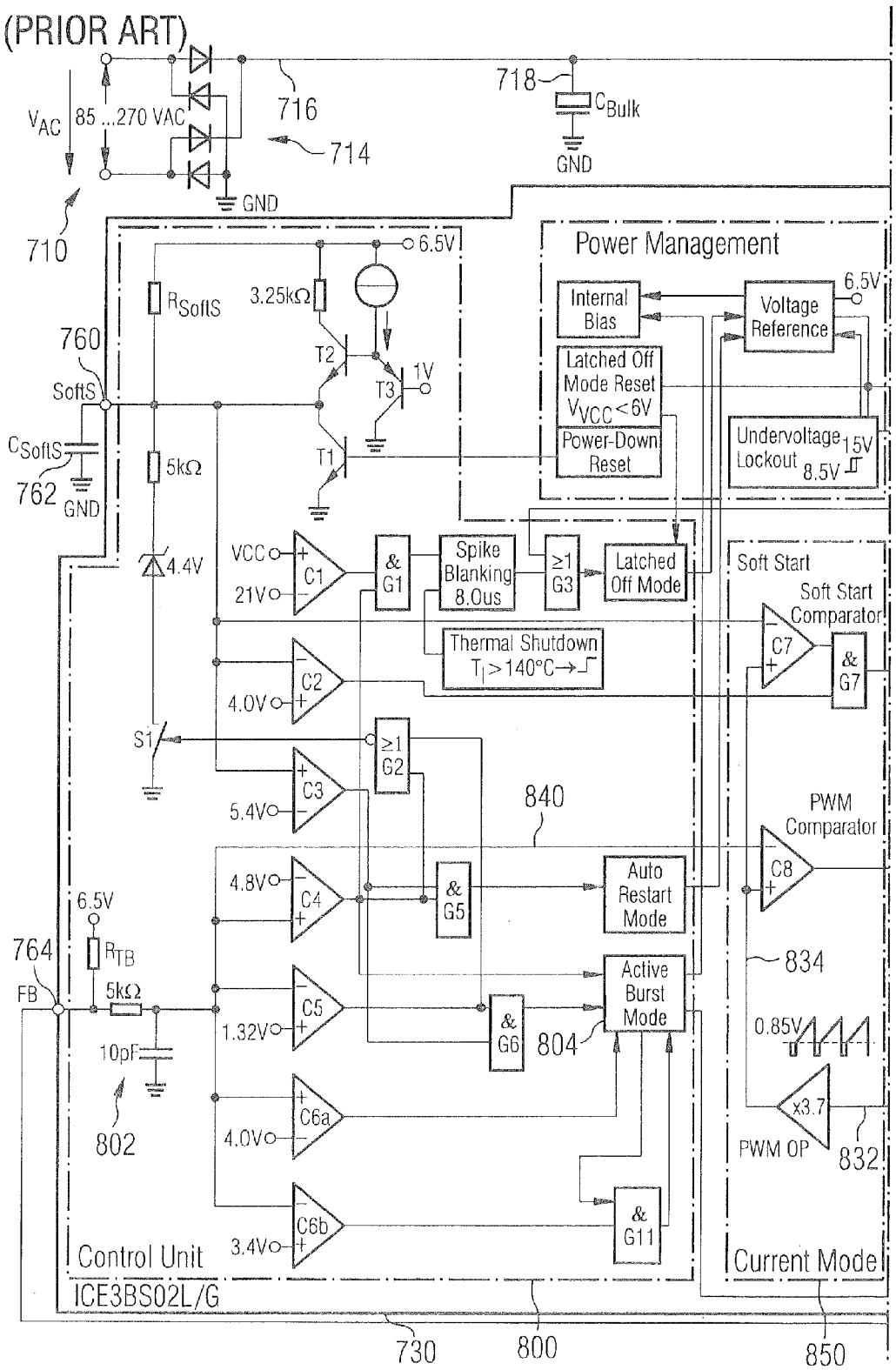
FIGS. 7a and 7b shows a detailed block schematic diagram of a known switching power supply.
Figure 7B:
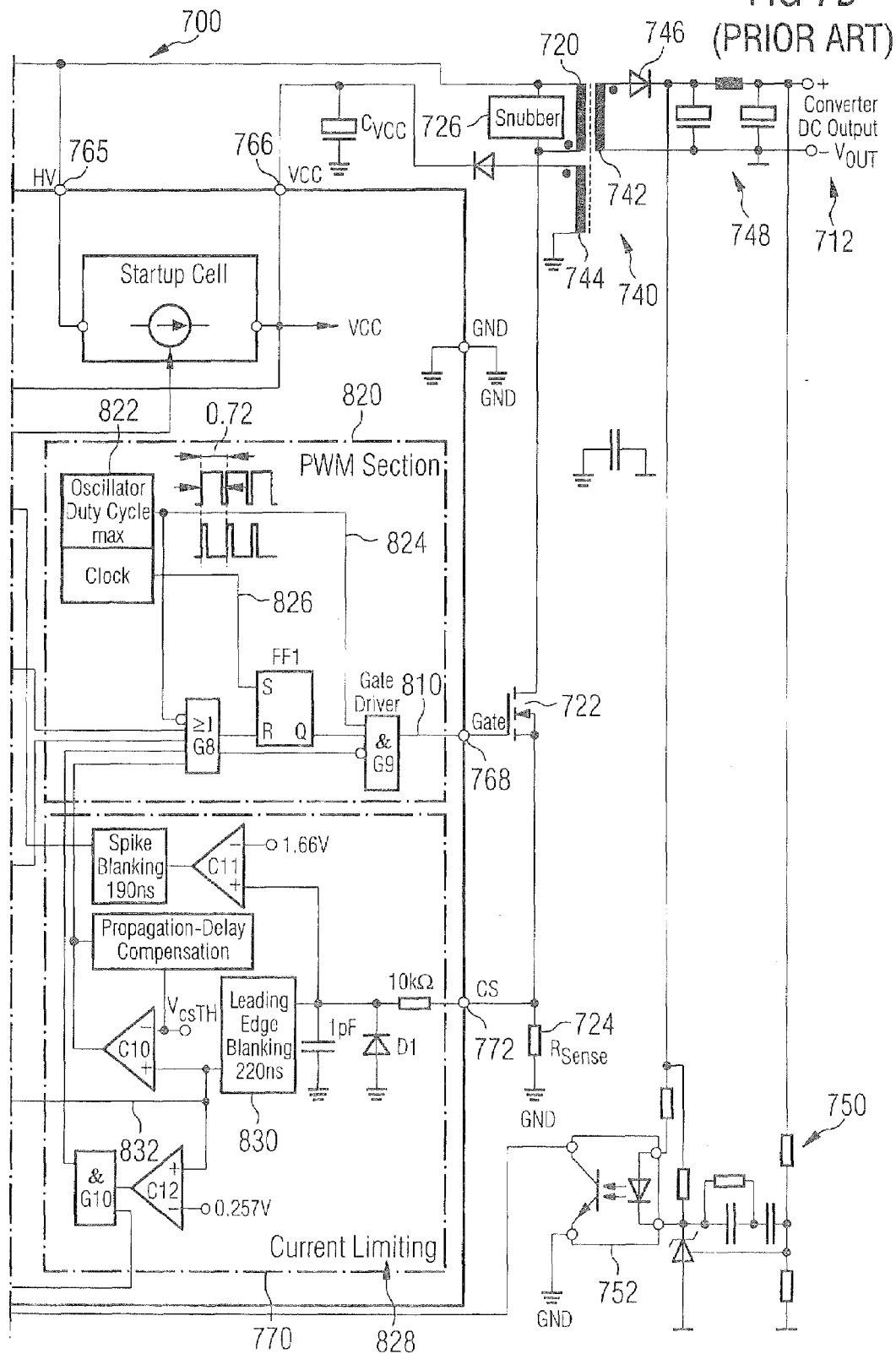

Reference is taken to the description of the known switching power supply as described in FIG. 7. In order to provide a good understanding, FIG. 2a shows a graphical representation of idealized waveforms present in the switching power supply 700 of FIG. 7. The graphical representation of FIG. 2a is designated in its entirety with 200. The graphical representation 200 shows the temporal course of four signals present within the switching power supply 700. In the first row 210, a temporal course of the gate drive signal 810 for the MOS field effect transistor 722 is shown. A low gate voltage of a first voltage level 212 indicates that the MOS field effect transistor 722 is switched off, while a high voltage level 214 indicates that the MOS field effect transistor 722 is switched on.

In a second row 220, the temporal course of the scaled current describing signal 834 describing the current through the drain-source-path of the MOS field effect transistor 722 is depicted.

In a third row 230 the temporal course of a current sense signal present at the current sense pin 772 is visualized. Under idealizing assumptions, the current sense signal at the current sense pin 772 exhibits a sawtooth characteristic and increases from an ideal value of 0 to a maximum value designated with $I_{MAX}$. The scaled signal 834 shown in the second row 220 is derived from the current sense signal shown in the third row 230. If the current sense signal is designated with $V_{CS}$ and the scaled signal 834 is designated with pwmrmp, the following relation is true except for a certain period of time related to the switching-on of the MOS-field effect transistor 722 current:

$$pwmrmp=0.85V+3.7\times V_{CS}.$$

When the MOS-field effect transistor 722 is switched on, the scaled signal 834 (i.e., the signal pwmrmp) is set to a value of about 0V for a predetermined time interval (e.g. 220 ns, cf. leading edge blanking 830) in order to blank leading edges occurring when MOS-field effect transistor 722 is switched on. In this way, interfering spikes are suppressed in the scaled signal 834.

Thus, the second column 220 shows the temporal course of the scaled signal 834, which takes a value of about 0 volt when MOS-field effect transistor 722 is just switched from the off-state to the on-state. Subsequently, the scaled signal increases up to a maximum value $pwmrmp_{MAX}$. The maximum value $pwmrmp_{MAX}$ is in the ideal case identical to the voltage level $V_{FB}$ of the feedback signal 840.

In the ideal case, the scaled signal 834 shown in the second row 220 drops from the ideal value $pwmrmp_{MAX}$ down to about 0.85V as soon as the scaled signal 834 reaches the level of the feedback signal 840. As an idealization, it is assumed that the MOS-field effect transistor 722 is immediately switched off as soon as the PWM-comparator C8 detects that the scaled signal 834 has reached the level of the feedback signal 840.

For reference purposes, a fourth row 240 shows the temporal course of the first clock signal 824, wherein a first state of the first clock signal 824 is designated with 242, and a second state is designated with 244. A transition of the first clock signal 824 from the first state 242 to the second state 244 results in an activation of the MOS-field effect transistor 722, as can be seen from a comparison of the first row 210 and the fourth row 240. Besides, the MOS-field effect transistor 722 is immediately switched off as soon as the scaled signal 834 reaches the level defined by the feedback signal 840.

It should further be noted that in a first column 250, the above-described signals are shown for a comparatively high slope rate of the current flowing through the drain-source-path of the MOS-field effect transistor 722 (and consequently for a higher slope rate of the voltage present at the current sense pin 772 of the integrated circuit 730). Besides in a second column 752 corresponding signals are shown for a comparatively low slope rate of the current flowing through the drain-source-path of MOS field effect transistor 722 (and the voltage present at the current sense pin 772 of the integrated circuit 730). A comparison of the idealized signals shown in the first column 250 and the second column 252 indicates that the maximum values reached by the scaled signal 834 are identical for both cases in the idealized graphical representation 200.

It should be noted here, that the signal designated with $V_{FB}$ reflects an output voltage information (describing the output voltage $V_{OUT}$ present at the output 712 of the switching power supply 700) which is available for the internal chip of the indicated circuit 730. The transition of the internal clock signal shown in the fourth column 240 sets the gate signal (shown in the first row 210) to be high. The power MOS-field effect transistor 722 is turned on by the gate signal 810. Then, current through the power-MOS field effect transistor 722 rises starting from approximately 0. The rising current flowing through the drain-source-path of the power MOS-field effect transistor 722 flows through the current sensing resistor 724 and therefore produces a rising current sense signal present at the current sense pin 772 of the integrated circuit 730. The current sense signal (also designated with CS) is imposed to the internal scaled signal 834 (also designated as pwmrmp), such that pwmrmp=0.85 V+3.7×$V_{CS}$. $V_{CS}$ is the voltage present at the current sense pin 772. The integrated circuit 730 comprises a comparator which is used to compare the feedback signal $V_{FB}$ and the pwmrmp signal. When the scaled signal 834 (pwmrmp) is higher than the feedback signal $V_{FB}$, the gate signal 810 of the power MOS-field effect transistor 722 is reset to low, and the power MOS-field effect transistor 722 is turned off. The voltage at the current sense pin 772 goes to a low value immediately. Consequently, the scaled signal 834 (pwmrmp) also goes to a low value (e.g. 0.85 volt) immediately.

In the ideal case described with reference to the graphical representation 200, when the scaled signal 834 (pwmrmp) is just higher than the feedback signal 840 ($V_{FB}$), the power-MOS field effect transistor 722 should be switched off immediately, and the current sense signal present at the current sense pin 772 should return back to 0 volt.

However, the above description only describes an ideal case. In reality, the switch-off of the external power-MOS field effect transistor 722 is delayed due to a propagation delay of the circuit (e.g. gate G8, flip flop FF1, gate G9 and the power-MOS field effect transistor 722 itself). In other words, the current flowing through the drain-source-path of the power-MOS field effect transistor 722 is switched off delayed by the propagation delay when compared to the point in time when the scaled signal 834 crosses the threshold level defined by the feedback signal 840.

Figure 2B:
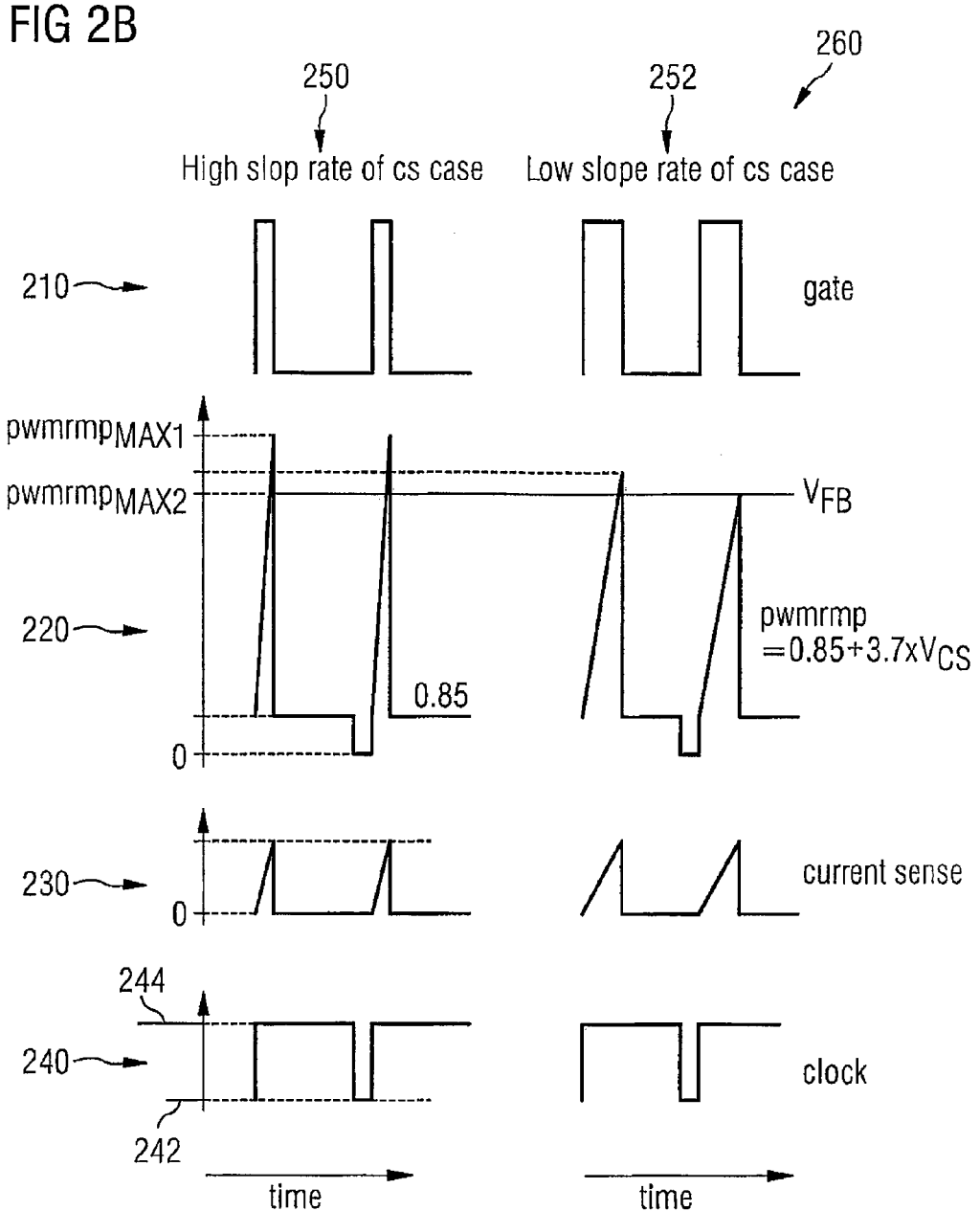
FIG. 2b shows real waveforms for different slope rates of a current flowing through the switch within a regulation circuit of a switching power supply.

FIG. 2b shows a graphical representation of real signals present in a switching power circuit 700. The graphical representation of FIG. 2b is designated in its entirety with 260. It should be noted here that the graphical representation 260 is similar to the graphical representation 200. Therefore, corresponding signals and levels are designated with same reference numerals. For details regarding corresponding elements, reference is taken to the description of FIG. 2a.

From the graphical representation 260 of FIG. 2b, which shows real signals under the assumption that the switching of the external power-MOS field effect transistor 722 is delayed due to the propagation delay of the circuit, it can be seen that there is some overshoot of the scaled voltage 834 (pwmrmp) over the feedback voltage $V_{FB}$. The overshoot is caused by a propagation delay in the circuit (gate G8, flip-flop FF1, gate G9, comparator C8 and power-MOS field effect transistor 722) of around 120 nanoseconds. Due to the propagation delay, the switch-off of the power MOS field-effect transistor 722 is delayed by approximately the propagation delay (120 nanoseconds) after the scaled voltage 834 (pwmrmp) is higher than the feedback voltage $V_{FB}$. It can be seen from FIG. 2b that for a higher slope rate of the current sense signal at the current sense pin 772, there is a higher overshoot than for the case of a lower slope rate of the current sense signal at the current sense pin 772. In case the current sense signal exhibits a high slope rate, the scaled signal 834 reaches a first maximum value (pwmrmp$_{MAX1}$—confer first column 250), while scaled signal 834 reaches a second maximum value (pwmrmp$_{MAX2}$) for the case of a lower slope rate of the current sense signal (confer second column 252). The first maximum value pwmrmp$_{MAX1}$ for the case of a high slope rate of the current sense signal is larger than the second maximum value pwmrmp$_{MAX2}$ for the case of low slope rate of the current sense signal.

It should be noted here that a higher maximum value of the scaled signal 834 corresponds to a higher maximum value of the current flowing through the first winding 720 or through the drain-source-path of the power-MOS field-effect transistor 722.

For a given level of the feedback signal 840 (also designated with $V_{FB}$) in the case of a higher slope rate of the current sense signal, more power is delivered to the secondary side of the switching power supply (i.e. to the second winding 742 and the filter network 748) than in the case of a lower slope rate of the current sense signal. Moreover, a higher slope rate of the current sense signal corresponds to a higher AC input voltage $V_{AC}$ present at the input 710 of the switching power supply 100. In other words, the slope rate of the current sense signal increases with the increasing AC input voltage $V_{AC}$. If the AC input voltage $V_{AC}$ is higher, the slope rate of the current flowing through the first winding 720 or through the MOS field effect transistor 722 is higher than if the AC input voltage $V_{AC}$ is lower. Thus, for a given level of the feedback signal 840 ($V_{FB}$), more power is delivered to the secondary side (the second winding 742 and the filter network 748) for the case of a higher AC input voltage $V_{AC}$ (when compared to the case of a lower AC input voltage). Vice-versa, when the AC input voltage $V_{AC}$ is lower, the slope rate of the current flowing through the first winding 720 or through the MOS field-effect transistor 722 is lower. In this case, for the given level of the feedback signal 840 ($V_{FB}$), less power is delivered to the secondary side.

For example, if the AC input voltage $V_{AC}$ has a value of 265 Volts, the current sense signal exhibits higher slope rate when compared to an AC input voltage of 85 Volts. Thus, for the AC input voltage of 265 Volts, the scaled signal 834 (pwmrmp) has more overshoot (compared to an AC input voltage of 85 Volts) and the system delivers more power to the secondary side. For the AC input voltage of 265 Volts and for a light load, the output voltage $V_{OUT}$ will go higher than for an AC input voltage of 85 Volts. For an AC input voltage of 265 Volt, the feedback voltage 840 ($V_{FB}$) goes lower than for the case of an AC input voltage of 85 Volts. Thus, if the condition for entering the active burst mode as described above is defined in that the active burst mode is entered when the feedback signal 840 crosses the threshold of 1.32 Volt, the chip will reliably (or definitely) go into active burst mode operation if the AC input voltage has a value of 265 Volts and a light load condition is present at the output 712 of the switching power supply (wherein a light load condition is defined by the fact that the power consumption of a load circuit connected to the output 712 of the switching power supply 700 is smaller than a given power consumption).

If the AC input voltage $V_{AC}$ is 85 Volts, the current sense signal exhibits a smaller slope rate (when compared to an AC input voltage of 265 Volts) and the scaled signal 834 (pwmrmp) exhibits less overshoot. Thus, at an AC input voltage of 85 Volts, the system delivers less power to the secondary side when compared to an AC input voltage of 265 Volts. Therefore, for a light load at the output 712 of the switching power supply 700, the output voltage $V_{OUT}$ will be lower than for a higher AC input voltage. The feedback voltage 840 ($V_{FB}$) is higher if the AC input voltage is 85 Volts when compared to the case of an AC input voltage of 265 Volts. Thus, if the AC input voltage is low (e.g. only 85 Volts), the chip will not reliably (or definitely) go into the active burst mode operation in the case of a light load condition at the output 712 of the switching power supply 700.

To summarize the above, due to the described overshoot of the current caused by the propagation delay of the circuitry driving the gate of the power MOS field-effect transistor 722 and the power MOS field-effect transistor 722 itself, the feedback voltage $V_{FB}$ generated under a given load condition varies with the AC input voltage $V_{AC}$. Thus, for a known switching power supply the feedback voltage $V_{FB}$ is not a reliable indicator of the load condition of the power supply. Therefore, in a known switching power supply it is not easily possible to use the feedback signal to control the transition of the switching power supply in the power-conserving mode.

Figure 3A:
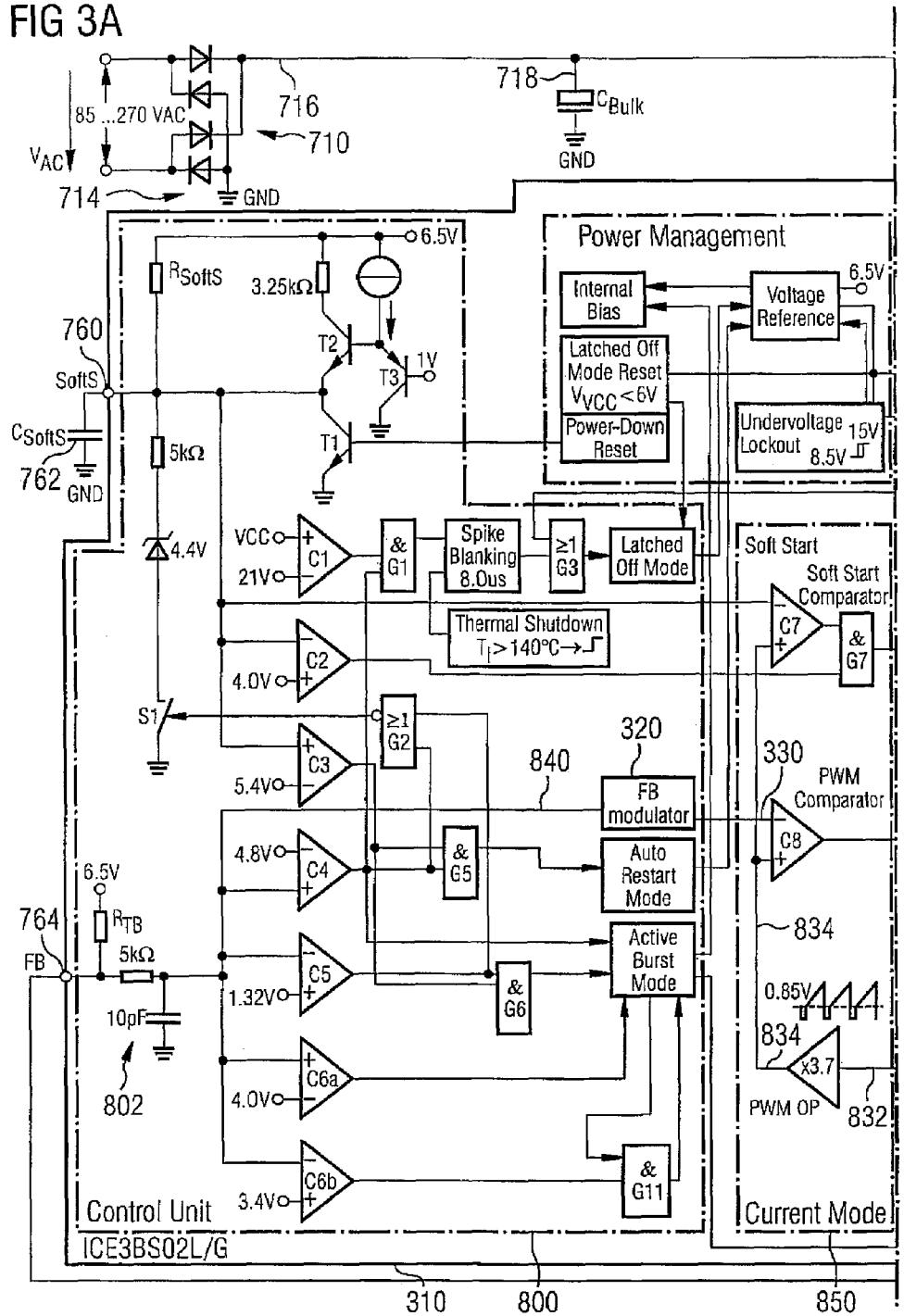
FIGS. 3a and 3b a detailed block schematic diagram of a control circuit for a switching power supply according to a second embodiment.
Figure 3B:
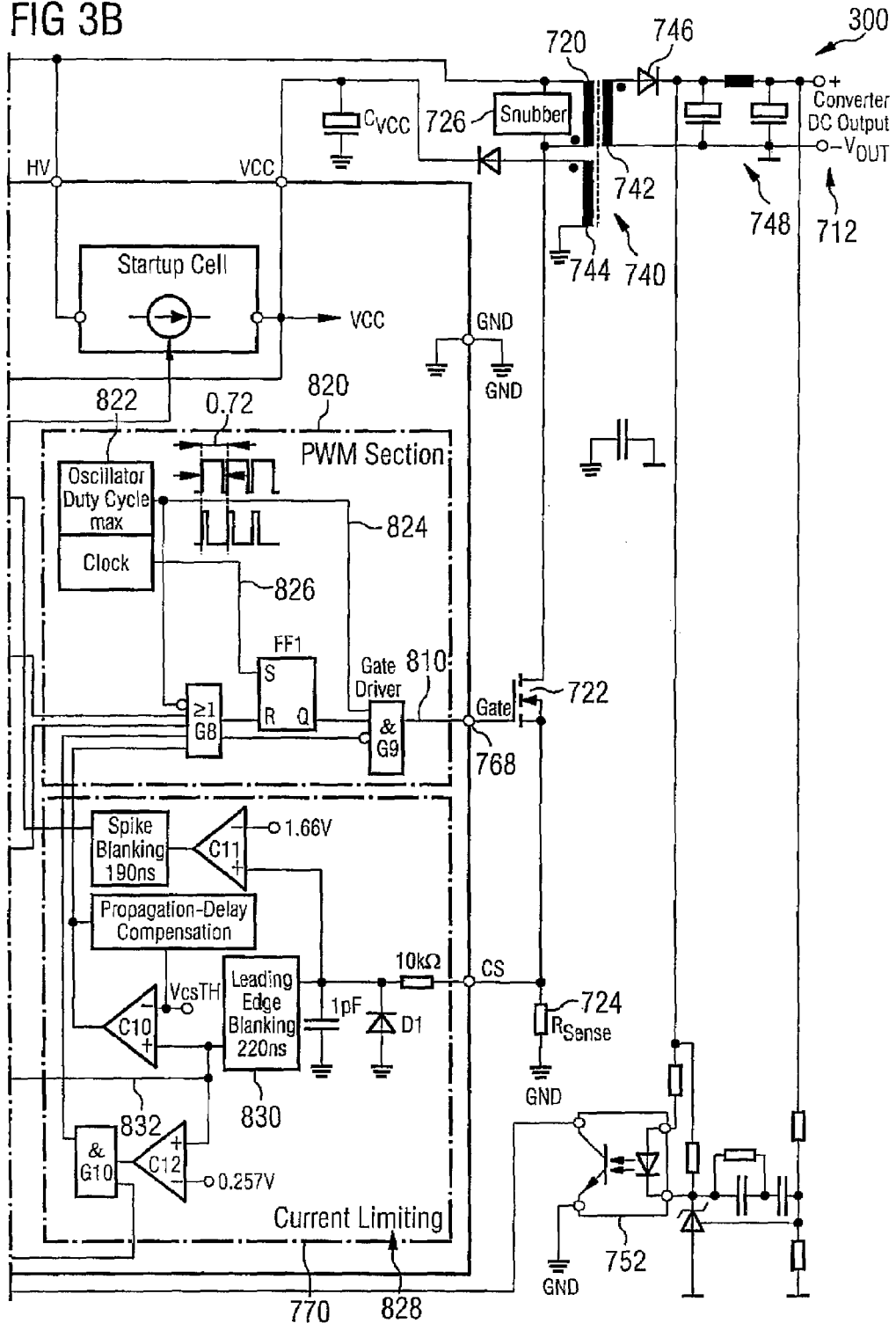

FIG. 3 shows a detailed block schematic diagram of a switching power supply comprising an control circuit according to an embodiment. The switching power supply of FIG. 3 is designated at its entirety with 300. As the switching power supply 300 is similar to the switching power supply 700 described with reference to FIG. 7, identical means and signals are designated with the same reference signs. Therefore, the means and signals which have already been explained with reference to FIG. 7 will not be explained again here. The reader's attention is therefore directed to the description of FIG. 7.

However, the integrated circuit designated with 730 in FIG. 7 is amended in order to obtain a new control circuit according to an embodiment. The amended integrated circuit, which is used in the switching power supply 300 of FIG. 3, is therefore designated with 310. The integrated circuit 310 comprises an additional threshold signal modulator circuit 320 when compared to the conventional integrated circuit 730. The threshold signal modulator circuit 320 (also designated as feedback modulator) receives the feedback signal 840 and generates a modulated threshold signal (also designated as modulated feedback signal 330) on the basis of the feedback signal 840. In the circuit 300 according to an embodiment, the pulse width modulator C8 of the integrated circuit 310 receives the scaled signal 834 (describing the current flowing through the drain-source-path of the MOS field-effect transistor 722) and compares it to the modulated threshold signal 330.

Thus, the integrated circuit 310 is modified, when compared to the integrated circuit 730, in that the pulse width modulation comparator C8 of integrated circuit 310 receives the modulated threshold signal 330 generated by threshold signal modulator 320 rather than in the feedback signal 840.

In the following, the function of the threshold signal modulation circuit 320 (feedback modulator) according to an embodiment will be described as a basis for the understanding of the control circuit according to an embodiment.

FIG. 4a shows a schematic diagram of an exemplary embodiment of an according to an embodiment threshold signal modulation circuit, which can be used in an control circuit according to an embodiment for a switching power supply. The circuit of FIG. 4a is designated in its entirety with 400. The threshold signal modulation circuit 400 receives as an input signal the feedback signal 840 (also designated as $V_{FB}$). Circuit 400 further receives a clock signal 824', which may be the inverse of the first clock signal 824. Furthermore, the circuit 400 provides the modulated threshold signal 330 as an output signal.

The feedback signal 840 is input to the non-inverting input of an operational amplifier 410. The output of the operational amplifier 410 is connected to the inverting input of the operational amplifier 410, so that the operational amplifier 410 acts as a voltage follower. Thus, the voltage at the output of the operational amplifier 410 follows the voltage of the feedback signal 840, wherein the input and the output of the operational amplifier are strongly decoupled. The circuit 400 further comprises a capacitor 414. In the circuit 400, a first electrode of the capacitor 414 is connected to reference potential or ground potential GND. A second electrode of the capacitor 414 is connected to a capacitor node 418. The capacitor node 418 is further coupled to the output of the operational amplifier 410 over a series connection of a first controllable switch 420 and a first resistor 422. Furthermore, a resistive voltage divider comprising a second resistor 430 and a third resistor 432 is coupled between the output of the operational amplifier 410 and the reference potential GND (or the first electrode of capacitor 414). An inner node 440 of the voltage divider, between resistors 430 and 432, is coupled over a second controllable switch 442 with capacitor node 418. Furthermore, the modulated threshold signal is available at the capacitor node 418.

The first controllable switch 420 and the second controllable switch 442 controlled to be closed mutually, so that the first controllable switch 420 is open when the second controllable switch 442 is closed and vice-versa. For this purpose, over an inverter 444, a control input of the first controllable switch 420 receives a control signal, which is inverse to the control signal provided to the second controllable switch 442. It should be noted here that the control signal provided to the first switch is equivalent to the inverse of the clock signal 824' and thus is in an active state when the first clock signal 824 is in an active state. On the other hand, the second controllable switch 442 receives the clock signal 824'. So, the first controllable switch 440 is closed, when the first clock signal 824 is in an active state, and the second controllable switch 442 is closed when the first clock signal 824 is in an inactive state.

In the following, the operation of the threshold signal modulation circuit 400 will be described with reference to FIG. 4b, wherein FIG. 4b shows a graphical representation of the relevant signals present in the threshold signal modulation circuit 400. For the following discussion, it is assumed that the feedback voltage $V_{FB}$ 840 is constant with time to facilitate the understanding. When the clock signal 824' changes from an inactive state 452 to an active state 454, the second controllable switch 442 is closed. The capacitor 414 is thus connected with the inner node 440 of the voltage divider comprising resistors 430, 432. The capacitor 414 is charged (or pulled) to a voltage which is determined by the voltage at the output of the operational amplifier in combination with the voltage divider comprising resistors 430, 432. To be more specific, the steady-state voltage of capacitor 414 when the second controllable switch 442 is closed is identical to the voltage present at the inner node 440 of the resistive voltage divider if the resistive voltage divider is not loaded (controllable switch 442 open). The capacitor 414 is pulled to voltage, which is lower than the voltage at the output of the operational amplifier 410. Further, the time constant, which is relevant for pulling capacitor 414 to the respective steady-state voltage is determined by resistors 430, 432. As can be seen from the graphical representation of FIG. 4b, the voltage at the capacitor 414, which is also designated as "dynamic feedback voltage" reaches a value of $V_{DIV}$ during the period of time when the second controllable switch 442 is closed.

When the clock signal 824' is deactivated, the first controllable switch 420 is closed and the second controllable switch 424 is opened. Consequently, capacitor 414 is charged (or pulled) to a voltage present at the output of operational amplifier 410. A time constant of the charging of the capacitor 414 is, in this case, determined by the resistor 422. In a steady state (which would be reached after a very long period of time), the voltage of the capacitor 414 would reach the voltage present at the output of the operational amplifier 410, i.e. in a voltage of the feedback signal 840.

In dependence on the clock signal 824', the capacitor 414 is periodically charged or pulled to the voltage of the feedback signal 840 present at the output of the operational amplifier 410 and to a smaller voltage, the open circuit voltage of the resistive voltage divider comprising resistors 430, 432, which is also dependent on the voltage of the feedback signal 840. In other words, for a constant feedback signal 840, the modulated feedback signal 330 periodically varies between two voltage levels both dependent on the voltage of the feedback signal 840.

FIG. 5 shows a schematic representation of waveforms for different slope rates of the current flowing through the first winding 720 or the MOS field effect transistor 722, for the switching power supply 300 comprising the control circuit according to an embodiment. The graphical representation of FIG. 5 is designated in its entirety with 500. It should be noted here that the signals described in FIG. 5 correspond to the signals described in the graphical representation 200 of FIG. 2a. Therefore, any element in the graphical representation 500 corresponding to an element described with reference to the graphical representation 200 is designated in the graphical representation 500 with a reference numeral, which differs only by the first digit when compared to the reference numerals of the corresponding element described with respect to the graphical representation 200. Thus, the description of such analog elements will be omitted here, and reference should be made to the graphical representation 200.

It should be noted that in contrast to the graphical representations 200, 260 of FIGS. 2a and 2b, the dynamic threshold signal 330 (also designated as dynamic feedback) is present in the control circuit according to an embodiment. Thus, the scaled signal descriptive of the current flowing through the drain-source-path of the MOS field effect transistor 722 is compared by the pulse width modulation comparator C8 with the modulated threshold signal 330, rather than with the non-modulated feedback signal $V_{FB}$ (see FIGS. 2a and 2b). It should further be noted that the modulation of the modulated threshold signal 330 is time-synchronized with the clock signal 828.

During the time when the clock signal 824 is in the inactive state 542, the modulated threshold signal 330 is monotonically falling. At the time, when the clock signal 824 transitions from the inactive state 542 to the active state 544, the MOS field effect transistor 722 is switched on (confer gate drive signal 810). At the same time, when the first clock signal 824 transitions from the inactive state 542 to the active state 544, the modulated threshold signal concurrently starts to increase monotonically until the first clock signal 824 is reset back to the inactive state 542. Thus, the threshold level for the pulse width modulation comparator C8 increases monotonically with time during the period in which the first clock signal 824 allows the MOS field effect transistor 720 to be switched on.

FIG. 6 shows a more detailed graphical representation of a scaled signal 834 and the modulated threshold signal 330. The graphical representation of FIG. 6 is designated in its entirety with 560. The scaled signal 834 is depicted within the same FIG. for two different slope rates. The scaled signal 834 obtained for a high AC input voltage of the switching power supply 300 is drawn using a solid line and is designated with 570. The scaled signal 834 obtained for a lower AC input voltage of the switching power supply 300 is drawn using a dashed line and is designated with 574. The signal 574 exhibits a smaller slope than the signal 570, as can be seen from FIG. 6. It is further assumed that for both cases described in FIG. 6, the feedback voltage 840 ($V_{FB}$) is identical. Consequently, the waveform of the modulated threshold signal 330 is identical for both cases. It can be seen from FIG. 6 that for a given feedback voltage $V_{FB}$, there is a lower feedback threshold voltage if the current sense signal has a higher slope rate (and, consequently, the scaled signal 834 has a higher slope rate). If the current sense signal has a lower slope rate (and, consequently, the scaled signal 834 has a lower slope rate), there is a higher threshold voltage. After the comparison (in the pulse width modulation comparator C8), the current sense signal and its imposed signal pwmrmp (or the scaled signal 834) stop at the same point (or level).

In other words, if the current flowing through the first winding 720 of the transformer 740 or through the drain-source-path of the field effect transistor 722 has a comparatively high slope, the corresponding scaled signal 834, i.e. the signal referenced with 570, has a comparatively high slope. Thus, the scale signal 570 reaches the time-variant modulated threshold signal 330 at a point in time designated with t1. Consequently, the comparison signal output by the pulse width modulator C8 is activated at time t1. Thus, the output of the pulse width modulation comparator C8 is activated when the scale signal 570 reaches the first threshold level designated with $V_{TH1}$. Due to the delay of the circuit between the pulse width modulation comparator C8 and the gate terminal of the MOS field effect transistor 722 and due to the delay of the MOS field effect transistor 722 itself, the current flowing through the drain-source-path of the MOS field effect transistor 722 is deactivated after a time period Δt. During time period Δt, the signal flowing through a drain-source-path of the MOS field effect transistor 722 increases by a certain first overshoot current, which is represented by a corresponding increase $V_{OS1}$ of the scaled signal 570.

For a smaller slope rate of the current flowing through the drain-source-path of the MOS field effect transistor 722, the slope rate of the corresponding scaled signal 834 is smaller, as can be seen from the signal designated with 574. Thus, for a smaller slope rate of the current flowing through the drain-source-path of the MOS field effect transistor 722, the output signal of the pulse width modulation comparator C8 is only activated when the scaled signal 574 reaches the second threshold level designated with $V_{TH2}$. An overshoot of the current flowing through the drain-source-path of MOS field effect transistors 722 occurs, which is reflected in the scaled signal 574. After the time period Δt, the scaled signal 574 reaches the second threshold level $V_{TH2}$. However, for the case of a smaller slope rate of the current, the overshoot is smaller (confer $V_{OS2}$). By means of the time variant threshold signal 330 it can be reached that the maximum value $V_{MAX}$ of the scaled voltage 834 is, at least approximately, identical for the case of small or large slope rates of the current flowing through the drain-source-path of the MOS field effect transistor 722.

It should be noted that the control circuit according to different embodiments as described with reference to FIGS. 1 to 6 can be modified in various ways without departing from the spirit of the invention. As mentioned above, according to different embodiments the threshold level of the pulse width modulation comparator is shifted in dependence on the slope rate of the current flowing through the first winding 720 or the MOS field effect transistor 722. As described above, the threshold can be shifted in an advantageous way by generating a time varying threshold signal using the threshold signal modulation circuit, wherein the level of the modulated threshold signal is dependent on the feedback voltage derived from the output circuit (the voltage providing a circuit) of the switching power supply.

However, instead of generating a time varying threshold signal, it is sufficient in another embodiment to produce the modulated threshold signal by shifting (modulating) the level of the feedback signal in dependence on the slope of the current flowing through the MOS field effect transistor 722 or the first winding 720. For this purpose, it is, for example, possible to derive a signal indicative of the slope rate of the current. For example, the signal present at the current sense pin 772, the leading edge blanked current describing signal 832 or the scaled current describing signal 834 can be evaluated for this purpose. The signal describing the slope rate of the current could then be entered into the threshold signal modulation circuit in order to statically shift the modulated threshold signal with respect to the feedback signal, such that the modulated threshold signal is substantially time constant, provided the feedback signal 840 is constant and the slope rate of the current exhibits a constant value. The slope rate dependent modulation (shift) of the modulated threshold signal may either be determined by the slope rate of the current at a certain point in time when the slope rate of the current is sampled, or may depend in a dynamic way on the present slope of the current, so that the modulated threshold signal varies (instantaneously) with the present slope rate.

Apart from the above, it should be noted that the slope of the current typically depends on the supply voltage 716. Thus, it is possible to directly derive a slope rate estimation signal from the supply voltage 716, wherein the slope rate estimation signal gives information about the expected slope rate of the current flowing through the first winding 720 or through the MOS field effect transistor 722. The slope rate estimation signal may be input to the threshold signal modulation circuit to determine a value by which the modulated threshold signal is shifted with respect to the feedback signal.

In a further embodiment, the scaled current describing signal 834 rather than the feedback signal 840 may be modulated. In this case, the threshold signal modulation circuit (feedback modulator 320) may be cancelled and replaced by a scaled signal modulation circuit inserted into a signal path providing the input signal to the non-inverting (+) input of the pulse width modulation comparator C8. In other words, a modulation may be applied to either the scaled current describing signal 834 or the current describing signal 832. It should be noted that modulating the scaled current describing signal 834, which is input to the non-inverted (+) input of the pulse width modulation comparator C8 is equivalent to modulating the feedback signal 840, which is input to the inverting (−) input of the pulse width modulation comparator C8.

Besides, the threshold signal modulation circuit 400 shown in FIG. 4a may be modified as long as it is ensured that a capacitor is alternatively charged (or pulled) to two different voltages, at least one of which is dependent on the feedback signal 840. Preferably, both voltages to which the capacitor is alternatively pulled are dependent on the feedback signal 840. In particular, the network for charging the capacitor on the basis of the feedback signal 840 may comprise non-linear elements to adapt the temporal course of the charging (or discharging) of the capacitor in such a way that the maximum current through the MOS field effect transistor 722 or the first winding 720 at the point in time when the MOS field effect transistor 722 is switched off is approximately independent on the slope rate of the current.

In the following, it will be described as to how far the usage according to different embodiments brings along significant advantages for entering energy conserving modes. Using an integrated circuit 310, 730, a lowest standby power can be achieved by using an active burst mode. In the active burst mode, the generation of current pulses is periodically interrupted in order to save energy. Details of the active burst mode have already described above. The active burst mode operation profile is as follows:

(a) Entering active burst mode:
when the feedback voltage $V_{FB}$ is smaller than 1.32 Volt and this condition takes a sufficiently long time (wherein the time constant is determined by the time required for charging the external soft start capacitor 762 by a resistor of 50 kΩ from 4.4 Volts to 5.4 Volts), the integrated circuit 310, 730 enters the active burst mode.

(b) Working during an active burst mode:
a generation of current pulses is controlled in such a way that the feedback voltage $V_{FB}$ swings from 3.4 Volts to 4.0 Volts. When the feedback voltage $V_{FB}$ is larger than 4.0 Volts, the chip is switched on. A current limitation is imposed by means of comparator C12, wherein the maximum allowable current flowing through the drain source path of the MOS field effect transistor 722 is determined by a reference voltage of 0.25 Volt. When the feedback voltage $V_{FB}$ is smaller than 3.4 Volts, the chip is switched off and the chip current consumption is greatly reduced.

(c) Leaving active burst mode:
when the feedback voltage $V_{FB}$ is larger than 4.0 Volts, the chip immediately leaves the burst mode operation and works as normal.

However, for example for the conventional switching power supply 700 of FIG. 7 it was found that there are still some problems regarding entering the burst mode.

Under certain light load conditions (when a power consumption of a load connected to the output 712 of the switching power supply 700 is smaller than a given value), the integrated circuit 730 can go into a burst mode operation for the case of a high input voltage $V_{AC}$ (for example, for an input voltage of 260 Volts AC), but not for the case of a lower input voltage $V_{AC}$ (for example, for an input voltage of 85 Volts AC) It would be possible to improve performance for entering the burst mode by increasing the threshold for the feedback voltage for entering the burst mode (i.e. the reference voltage input to the comparator C5) from 1.32 Volt to 1.50 Volt. Besides, it would be possible to improve the performance for entering the burst mode by increasing the voltage input to comparator C12 from 0.25 Volt to 0.35 Volt during burst mode, which means increasing the current limiting threshold during burst mode. Considering the above described improvements regarding the entering burst mode threshold and the current limiting threshold, the integrated circuit 730 could go into a burst mode operation for a wide range of the input voltage $V_{AC}$. However, the described amendments (increasing entering the burst mode threshold from 1.32 Volt to 1.50 Volt and increasing the current limiting threshold from 0.25 Volt to 0.35 Volt during the burst mode) bring along the problem that the entering burst mode load condition is increased and that the leaving burst mode load condition is increased. Moreover, the described modifications increase the risk that audible noise is generated by the switching power supply when the load increases slightly, until the burst mode is left. The higher the power to be provided by a switching power supply, the more serious are the drawbacks of the above-described approaches.

In other words, in known switching power supplies, the only way of ensuring that the integrated circuit 730 can enter into a burst mode operation for a wide range of input voltages $V_{AC}$ has been increasing the threshold voltage for entering the burst mode. However, such a conventional solution brings along the problem that audible noise is generated under some load conditions. Other solutions for improving the performance when entering the active burst mode are not known from known switching power supplies. Thus, the known switching power supply concept is not able to satisfy the requirements for entering the active burst mode.

In order to solve the above-mentioned problem when entering the active burst mode, it was investigated what is the root cause for the described problems. After investigation, it was found that the root cause of the problems related to the active burst mode is the current overshoot problem occurring in known switching power supplies. The problem of current overshoot has been described with reference to FIGS. 2a and 2b. In order to achieve an improved behavior of the integrated circuit 730 when entering into the burst mode operation, the threshold signal modulation circuit (also designated as feedback modulator) is inserted into the known integrated circuit 730 to obtain the integrated circuit 310 according to an embodiment. By means of this modification, the entering of the burst mode issue known from known switching power supplies is solved. The threshold signal modulation circuit (feedback modulator block) according to an embodiment comprises only one operational amplifier 410, one low pass filter (comprising the capacitor 414 and the first resistor 422), some resistors (resistor 430 and 432) and two switches 422, 442, as can be seen from FIG. 4a. Using the reference signal modulation circuit 400 of FIG. 4a, a time-constant feedback voltage $V_{FB}$ is changed into a dynamic threshold voltage 330. It can be seen from the waveforms shown in the graphical representation of FIG. 4b how the threshold signal modulation circuit 410 of FIG. 4a actually works. It can also be seen from the graphical representation of FIG. 4b that the feedback voltage $V_{FB}$ is imposed to one dynamic signal, which is used for comparison with the scaled current-describing signal 840 (pwmrmp) to obtain a regulation of the output voltage $V_{OUT}$ Of the switching power supply.

Regarding to entering the burst mode, the threshold voltage for the feedback voltage $V_{FB}$ for entering the burst mode may be set to 1.32 Volt or less when using the concept according to an embodiment. In other words, if the feedback voltage gets smaller than 1.32 Volt, the active burst mode is entered. The concept according to an embodiment of using a modulated threshold signal (or dynamic feedback voltage) brings along the advantage that there is no current sense signal overshoot issue for high AC input voltages $V_{AC}$. Consequently, a switching power supply (also designated as system) according to different embodiments delivers the same power to the secondary side for a given feedback voltage independent of the AC input voltage $V_{AC}$. Thus, the conditions for entering the burst mode operation are the same for high AC input voltage and low AC input voltage $V_{AC}$.

In other words, the entering burst mode issue observed in conventional switching power supplies can be solved by using a dynamic feedback voltage as a threshold voltage for the pulse width modulation regulation. Therefore, the solution according to different embodiments improves the entering burst mode performance. The new solution comprises the following characteristics:

(a) The feedback voltage for (reliably) entering burst mode can be set to a comparatively low value when compared to known solutions, and (b) a switching power supply comprising an control circuit according to an embodiment in the chip 330 (reliably) enters into a burst mode for a wide range of input voltages (e.g. between 85 Volts AC and 265 Volts AC).

The present invention further comprises a method for controlling a switching power supply. It is assumed that the switching power supply comprises a controllable switch for switching a current flowing through a first winding of a transformer and a voltage providing circuit for providing an output voltage based on a voltage generated a second winding of a transformer. Furthermore, it is assumed that the power supply comprises a switch driver for periodically closing the switch, and for opening the switch in response to the occurrence of a condition to open the switch, wherein the condition to open the switch is based on a comparison between a modulated threshold signal and a signal derived from a current through the controllable switch or through the first winding of the transformer. The method according to an embodiment comprises the step of modulating the threshold signal dependent on a voltage present in the voltage providing circuit in such a way that a comparison between the modulated threshold signal and the signal derived from the current through the controllable switch or through the first winding of the transformer yields a condition to open the switch as soon as the signal derived from the current through the controllable switch or through the first winding crosses a first threshold value if the current through the switch or the first winding exhibits a first slope rate and that the comparison between the modulated threshold signal and a signal derived from a current through the controllable switch or the first winding of the transformer yields the condition to open the switch as soon as the signal derived from the current through the controllable switch or through the first winding crosses a second threshold value, if the current through the switch or through the first winding exhibits a second slope rate smaller than the first slope rate, wherein, for a given voltage present in the voltage providing circuit, the first threshold value is smaller than the second threshold value.

The method according to an embodiment can be supplemented by any of the steps performed by the above-described control circuit according to an embodiment.

Furthermore, the present invention comprises a computer program product for executing the above-described method. Depending on certain implementation requirements of the method according to an embodiment, the method according to an embodiment can be implemented in hardware or in software. The implementation can be performed using a digital storage medium, for example a disk, DVD, CD, ROM, PROM, EPROM, EEPROM or FLASH, having electronically readable control signals stored thereon, which cooperate with a programmable computer system such that the methods according to different embodiments are performed. Generally, the present invention is, therefore, a computer program product with a program code stored on a machine readable carrier, the program code being operative for performing the methods according to an embodiment when the computer program product runs on a computer. In other words, the method according to an embodiment is, therefore, a computer program having a program code for performing the method according to an embodiment when the computer program runs on a computer.

It should further be noted that FIG. 7 shows an Infineon technologies Coolset F3 controller 730, which is a chip used for AC/DC controllers with the lowest standby power. In other words, FIG. 7 shows a block diagram of the Infineon Coolset F3 controller 730, along with a minimum of peripheral components necessary in order to yield a functional switching power supply. Accordingly, FIGS. 2a and 2b show waveforms present in the Coolset F3 controller performing a current mode regulation for different slope rates of the current flowing through the MOS field effect transistor 722. FIG. 2a describes idealized waveforms for different slope rates of Coolset F3 regulation, and FIG. 2b shows real waveforms for different slope rates of Coolset F3 regulation.

As can be seen from FIG. 3, according to an embodiment an additional block, the feedback modulator 320, is inserted into the block diagram of the known Coolset F3 controller 730. Thus, FIG. 3 shows an modified version according to an embodiment of the Coolset F3 controller, and FIG. 5 shows regulation waveforms occurring in the modified Coolset F3 controller for different slope rates of the current.

To summarize the above, the present invention creates an improved control circuit for a switching power supply, by means of which the accuracy of the regulation of the output voltage can be improved for a wide range of AC input voltages. Thus, a dependency of a voltage occurring in the secondary voltage providing circuit of the switching power supply on the AC input voltage can be reduced, such that the feedback signal fed back from the voltage providing circuit to a pulse width modulation circuit is a good indication of the load of the switching power supply. For this reason, the feedback voltage available in a switching power supply using the present invention is a good measure to decide whether to enter an energy conserving mode or not.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A control circuit for a switching power supply comprising a controllable switch for switching a current flowing through a first winding of a transformer and a voltage providing circuit for providing an output voltage based on a voltage generated in the second winding of the transformer, the control circuit comprising:

a comparing circuit for getting a comparison signal based on a comparison between an input signal derived from a current through the switch or through the first winding and a threshold signal derived from a voltage present in the voltage providing circuit;

a threshold signal modulation circuit adapted to modulate the threshold signal in such a way that the comparison signal is activated as soon as the input signal derived from the current flowing through the switch or through the first winding crosses a first threshold value, if the current flowing through the switch or through the first winding exhibits a first current slope rate, and that the comparison signal is activated as soon as the input signal of the comparing circuit describing the current flowing through the switch or through the first winding crosses a second threshold value, if the current flowing through the switch or through the first winding exhibits a second current slope rate smaller than the first current slope rate, wherein, for a given voltage present in the voltage providing circuit, the first threshold value is smaller than the second threshold value; and a switch driver for closing the switch periodically, and for opening the switch in response to an activation of the comparison signal provided by the comparing circuit.

2. The control circuit of claim 1, wherein the threshold signal modulation circuit is adapted to modulate the threshold signal in such a way that the comparison signal is activated when the current flowing through the switch or through the first winding exhibits a first current magnitude, if the current flowing through the switch or through the first winding exhibits a first current slope rate, and that the comparison signal is activated when the current flowing through the switch or through the first winding exhibits a second current magnitude, if the current flowing through the switch or through the first winding exhibits a second current slope rate smaller than the first current slope rate, wherein the first current magnitude is smaller than the second current magnitude.

3. The control circuit of claim 2, wherein the switch driver comprises a propagation delay so that the switch is opened in response to the activation of the comparison signal delayed by the propagation delay;

wherein an increase of the current flowing through the switch or through the first winding occurring during the propagation delay is dependent on the slope rate of the current; and wherein the threshold signal modulation circuit is adapted to modulate the threshold signal in such a way that the slope-rate-dependent increase of the current during the propagation delay time is at least partially compensated for by the modulation of the threshold signal.

4. The control circuit of claim 1, wherein the comparing circuit is a comparator adapted to receive the input signal derived from the current flowing through the switch or through the first winding and the threshold signal, and to activate the comparison signal if the input signal derived from the current indicates that the current flowing through the switch or through the first winding is larger than a threshold specified by the threshold signal.

5. The control circuit of claim 1, wherein the threshold signal modulation circuit is adapted to provide the modulated threshold signal in such a way that the modulated threshold signal decreases with an increasing voltage present in the voltage providing circuit.

6. The control circuit of claim 1, wherein the comparing circuit and the threshold modulation circuit are part of a feedback loop to adjust a duty cycle of the switch in dependence on the voltage present in the voltage providing circuit; and wherein the comparing circuit is adapted such that for a given slope rate of the current flowing through the switch or through the first winding, the duty cycle of the switch decreases with an increasing voltage present in the voltage providing circuit.

7. The control circuit of claim 1, wherein the threshold signal modulation circuit is adapted to receive the signal descriptive of a voltage present in the voltage providing circuit, and to generate the threshold signal as a time-varying modulated threshold signal on the basis of the received signal descriptive of the voltage present in the voltage providing circuit, such that the threshold signal exhibits a time variation even if the received signal is constant,
wherein the received signal has an influence on a voltage level of the threshold signal; and
wherein the threshold signal modulation circuit is adapted such that a temporal modulation of the threshold signal is time-synchronized at least with an opening of the switch or a closing of the switch.

8. The control circuit of claim 1, wherein the control circuit is adapted to derive the input signal of the comparing circuit derived from the current flowing through the switch or through the first winding such that the derived input signal is linearly dependent on the current flowing through the switch or through the first winding in a first time interval, and to set the derived signal to a fixed value in a second time interval.

9. The control circuit of claim 1, wherein the control circuit further comprises a clock circuit adapted to generate a clock signal;
wherein the switch driver is adapted to close the switch in response to a transition of the clock signal from a first state to a second state; and
wherein the threshold signal modulation circuit is adapted to pull the threshold signal to a first value when the clock is in the first state, and to monotonically vary the threshold signal when the clock is in the second state, such that the threshold signal defines a threshold level increasing with time when the clock is in the second state.

10. The control circuit of claim 9, wherein the control circuit is adapted to set the signal derived from the current flowing through the switch or through the first winding to a predetermined value when the clock signal is in the first state.

11. The control circuit of claim 9, wherein the threshold signal modulation circuit comprises a capacitor and is adapted to provide the voltage at the capacitor as the threshold signal or to derive the threshold signal from the voltage and the capacitor,
wherein the threshold signal modulation circuit is further adapted to charge the capacitor to a first voltage over a first resistor when the clock signal is in the first state, and to charge the capacitor to a second voltage over a second resistor when the clock signal is in the second state.

12. The control circuit of claim 11, wherein the threshold signal modulation circuit comprises a voltage source adapted to provide a first open circuit voltage with a predetermined first output impedance and to provide a second open circuit voltage with a predetermined second output impedance,
wherein the first open circuit voltage and/or the second open circuit voltage are dependent on the voltage present in the voltage providing circuit;
wherein the second open circuit voltage is smaller than the first open circuit voltage; and
wherein the threshold signal modulation circuit further comprises a first switch to charge the capacitor to the first open circuit voltage when the first switch is closed, and a second switch to charge the capacitor to the second open circuit voltage when the second switch is closed.

13. The control circuit of claim 12, wherein the threshold signal modulation circuit comprises a voltage providing node, at which a voltage dependent on the voltage present in the voltage providing circuit is present;
wherein the voltage providing node is connected to the capacitor over a series connection of the first switch and the first resistor; and
wherein an inner node of a voltage divider network connected between the voltage providing node and the reference potential is connected to the capacitor over the second switch.

14. The control circuit of claim 1, wherein the threshold signal modulation circuit is adapted to derive an information about the slope rate of the current flowing through the switch or through the first winding from the input signal derived from the current flowing through the switch or through the first winding, and to modulate the threshold signal in dependence on the information about the slope rate.

15. The control circuit of claim 1, wherein the current slope rate is dependent on a supply voltage supplying a series connection of the controllable switch and the first winding of the transformer; and
wherein the threshold signal modulation circuit is adapted to derive an information about the slope rate of the current flowing through the switch or through the first winding from the supply voltage, and to modulate the threshold signal in dependence on the information about the slope rate.

16. The control circuit of claim 1, wherein the control circuit is further adapted to control a transition between a normal mode of operation and an energy conserving mode of operation on the basis of the voltage present in the voltage providing circuit.

17. A method for controlling a switching power supply comprising a controllable switch for switching a current flowing through a first winding of a transformer, a voltage providing circuit for providing an output voltage based on a voltage generated in a second winding of the transformer and a switch driver for periodically closing the switch and for opening the switch in response to an occurrence of a condition to open the switch, the method comprising:
modulating a threshold signal dependent on a voltage present in the voltage providing circuit in such a way that a comparison between the threshold signal and a signal derived from a current flowing through the controllable switch or through the first winding yields a condition to open the switch as soon as the signal derived from the current through the controllable switch reaches a first threshold value, if a current through the switch or through the first winding exhibits a first slope rate, and that the comparison between the threshold signal and the signal derived from the current through the controllable switch or through the first winding yields a condition to open the switch as soon as the signal derived from the current through the controllable switch or through the first winding reaches a second threshold value, if the current through the switch or the first winding exhibits a second slope rate smaller than the first slope rate,
wherein, for a given voltage present in the voltage providing circuit, the first threshold value is smaller than the second threshold value.

18. A computer program product comprising a program code stored on a computer readable medium, wherein the program code when executed on a computer performs a method for controlling a switching power supply comprising a controllable switch for switching a current flowing through a first winding of a transformer, a voltage providing circuit for providing an output voltage based on a voltage generated in a second winding of the transformer and a switch driver for periodically closing the switch and for opening the switch in response to an occurrence of a condition to open the switch, the method comprising:

modulating a threshold signal dependent on a voltage present in the voltage providing circuit in such a way that a comparison between the threshold signal and a signal derived from a current flowing through the controllable switch or through the first winding yields a condition to open the switch as soon as the signal derived from the current through the controllable switch reaches a first threshold value, if a current through the switch or through the first winding exhibits a first slope rate, and that the comparison between the threshold signal and the signal derived from the current through the controllable switch or through the first winding yields a condition to open the switch as soon as the signal derived from the current through the controllable switch or through the first winding reaches a second threshold value, if the current through the switch or the first winding exhibits a second slope rate smaller than the first slope rate, wherein, for a given voltage present in the voltage providing circuit, the first threshold value is smaller than the second threshold value.

* * * * *